United States Patent
Yamada et al.

(10) Patent No.: US 12,306,292 B2
(45) Date of Patent: May 20, 2025

(54) IMAGING APPARATUS INCLUDING SUB-TERAHERTZ WAVE REFLECTIVE MEMBER

(71) Applicant: Panasonic Intellectual Property Management Co., Ltd., Osaka (JP)

(72) Inventors: Kazuhiro Yamada, Osaka (JP); Yosuke Asai, Osaka (JP); Hiroshi Yamaguchi, Osaka (JP); Katsuhiko Hayashi, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 378 days.

(21) Appl. No.: 18/079,218

(22) Filed: Dec. 12, 2022

(65) Prior Publication Data

US 2023/0116330 A1    Apr. 13, 2023

Related U.S. Application Data

(63) Continuation of application No. PCT/JP2020/047286, filed on Dec. 17, 2020.

(30) Foreign Application Priority Data

Jun. 19, 2020 (JP) .................... 2020-106525

(51) Int. Cl.
*G01S 13/88* (2006.01)
*G01N 21/17* (2006.01)
(Continued)

(52) U.S. Cl.
CPC .......... *G01S 13/888* (2013.01); *G01S 13/867* (2013.01); *G01V 5/20* (2024.01); *G01V 5/222* (2024.01);
(Continued)

(58) Field of Classification Search
CPC .......... G01N 21/3581; G01N 21/4738; G01N 2021/1765; G01S 13/867; G01S 13/888;
(Continued)

(56) References Cited

U.S. PATENT DOCUMENTS

| 6,242,740 B1 | 6/2001 | Luukanen et al. |
| 2006/0214176 A1 | 9/2006 | Ouchi et al. |

(Continued)

FOREIGN PATENT DOCUMENTS

| JP | 11-225016 | 8/1999 |
| JP | 2001-119193 | 4/2001 |

(Continued)

OTHER PUBLICATIONS

International Search Report (ISR) issued on Mar. 16, 2021 in International (PCT) Application No. PCT/JP2020/047286.

*Primary Examiner* — Keith G. Delahoussaye
(74) *Attorney, Agent, or Firm* — Wenderoth, Lind & Ponack L.L.P.

(57) ABSTRACT

An imaging apparatus includes: a diffuse-reflector which covers an imaging space on a pathway that a human passes through, from at least a side out of both sides of the pathway, and includes a reflector which diffusely reflects a sub-terahertz wave; a light source which emits a sub-terahertz wave onto the reflector; and a detector which receives a reflected wave of the sub-terahertz wave which has been emitted from the light source, diffusely reflected by the reflector, and reflected by the human, and detects an intensity of the reflected wave received. The diffuse-reflector includes a visible light transmissive area which transmits visible light.

20 Claims, 13 Drawing Sheets

(51) Int. Cl.
*G01N 21/3581* (2014.01)
*G01N 21/47* (2006.01)
*G01S 13/86* (2006.01)
*G01V 5/20* (2024.01)
*G01V 5/222* (2024.01)
*G01V 5/26* (2024.01)
*G02B 5/02* (2006.01)
*G02B 5/20* (2006.01)

(52) U.S. Cl.
CPC ......... *G02B 5/0221* (2013.01); *G02B 5/0284* (2013.01); *G02B 5/208* (2013.01); *G01N 2021/1765* (2013.01); *G01N 21/3581* (2013.01); *G01N 21/4738* (2013.01); *G01V 5/26* (2024.01)

(58) Field of Classification Search
CPC ... G01V 5/20; G01V 5/22; G01V 5/26; G02B 5/0284; G02B 5/205
USPC .................................. 359/599; 250/330, 334
See application file for complete search history.

(56) References Cited

U.S. PATENT DOCUMENTS

| | | | |
|---|---|---|---|
| 2008/0195347 A1* | 8/2008 | Gatt | G01V 9/00 |
| | | | 702/134 |
| 2009/0294704 A1 | 12/2009 | Zailer et al. | |
| 2018/0321374 A1* | 11/2018 | Qi | G01S 13/887 |
| 2019/0259791 A1 | 8/2019 | Itsuji et al. | |
| 2020/0146191 A1 | 5/2020 | Toyoda et al. | |
| 2020/0320814 A1* | 10/2020 | Hastings | G01V 5/20 |
| 2022/0224845 A1 | 7/2022 | Yamada et al. | |

FOREIGN PATENT DOCUMENTS

| | | |
|---|---|---|
| JP | 2003-190112 | 7/2003 |
| JP | 2006-278366 | 10/2006 |
| JP | 2011-192978 | 9/2011 |
| JP | 2014-195616 | 10/2014 |
| JP | 2017-112154 | 6/2017 |
| JP | 2018-87725 | 6/2018 |
| WO | 2018/008768 | 1/2018 |
| WO | 2018/163584 | 9/2018 |
| WO | 2021/070428 | 4/2021 |

* cited by examiner

IMAGING APPARATUS INCLUDING SUB-TERAHERTZ WAVE REFLECTIVE MEMBER

CROSS REFERENCE TO RELATED APPLICATIONS

This is a continuation application of PCT International Application No. PCT/JP2020/047286 filed on Dec. 17, 2020, designating the United States of America, which is based on and claims priority of Japanese Patent Application No. 2020-106525 filed on Jun. 19, 2020. The entire disclosures of the above-identified applications, including the specifications, drawings and claims are incorporated herein by reference in their entirety.

FIELD

One or more exemplary embodiments disclosed herein relate generally to imaging apparatuses.

BACKGROUND

Conventionally, imaging apparatuses which capture images of imaging targets using a terahertz wave and a sub-terahertz wave have been known. For example, Patent Literature 1 discloses an image obtaining apparatus which obtains an image of a target using a terahertz wave.

CITATION LIST

Patent Literature

PTL 1: Japanese Unexamined Patent Application Publication No. 2018-87725

SUMMARY

Technical Problem

Imaging apparatuses which capture images of imaging targets using sub-terahertz waves are required to efficiently irradiate the imaging targets with sub-terahertz waves in order to, for example, increase the image quality.

One non-limiting and exemplary embodiments provide imaging apparatuses capable of efficiently irradiating the imaging targets with sub-terahertz waves.

Solution to Problem

In one general aspect, the techniques disclosed here feature an imaging apparatus according to an aspect of the present disclosure includes a diffuse-reflector which covers an imaging space on a pathway that an imaging target passes through, from at least a side out of both sides of the pathway, and includes a reflector which diffusely reflects a sub-terahertz wave; a light source which emits a sub-terahertz wave onto the reflector; and a detector which receives a reflected wave of the sub-terahertz wave which has been emitted from the light source, diffusely reflected by the reflector, and reflected by the imaging target, and detects an intensity of the reflected wave received. The diffuse-reflector includes a visible light transmissive area which transmits visible light.

In one general aspect, the techniques disclosed here feature an imaging apparatus according to an aspect of the present disclosure includes a diffuse-reflector which covers an imaging space on a pathway that an imaging target passes through, from at least a side out of both sides of the pathway, and includes a reflector which diffusely reflects a sub-terahertz wave; a light source which emits a sub-terahertz wave onto the reflector; and a detector which receives a reflected wave of the sub-terahertz wave which has been emitted from the light source, diffusely reflected by the reflector, and reflected by the imaging target, and detects an intensity of the reflected wave received. The reflector reflects visible light from the imaging space.

General and specific aspect(s) disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The imaging apparatuses according to one or more exemplary embodiments or features disclosed herein each make it possible to efficiently irradiate the imaging target with a sub-terahertz wave.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Summary of the Present Disclosure

Figure 1:
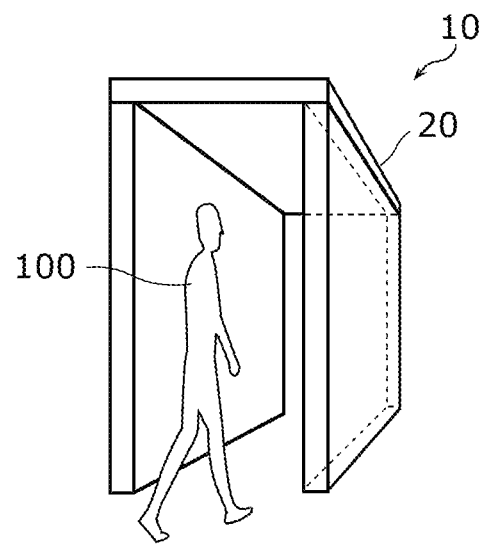
FIG. 1 is a schematic diagram illustrating an appearance of an imaging apparatus according to Embodiment 1.

The summary of aspects of the present disclosure are as indicated below.

An imaging apparatus according to an aspect of the present disclosure includes: a diffuse-reflector which covers an imaging space on a pathway that an imaging target passes through, from at least a side out of both sides of the pathway, and includes a reflector which diffusely reflects a sub-terahertz wave; a light source which emits a sub-terahertz wave onto the reflector; and a detector which receives a reflected wave of the sub-terahertz wave which has been emitted from the light source, diffusely reflected by the reflector, and reflected by the imaging target, and detects an intensity of the reflected wave received. The diffuse-reflector includes a visible light transmissive area which transmits visible light.

It is to be noted that "a sub-terahertz wave" in the DESCRIPTION means an electromagnetic wave of a frequency in a range from 0.05 THz to 2 THz, inclusive. The sub-terahertz wave in the DESCRIPTION may be an electromagnetic wave of a frequency in a range from 0.08 THz to 1 THz, inclusive. In addition, in the DESCRIPTION, "being diffusely reflected" means that a sub-terahertz wave which enters a reflector at one incidence angle from a macro perspective is reflected at a plurality of reflection angles by a structure with a plurality of concaves and convexes from a micro perspective.

According to the aspect, the imaging space is covered by the reflector from at least one side of the imaging space, and thus the sub-terahertz wave emitted from the light source is diffusely reflected by the reflector and enters the imaging target. In this way, an entirety of an imaging space side surface of the reflector functions as a surface light source, and a comparatively wide surface range of the imaging target is irradiated with the sub-terahertz waves at various angles. Although a visible light tends to be diffusely reflected on a surface of an imaging target, a sub-terahertz wave tends to be mirror-reflected on a surface of an imaging target because the sub-terahertz wave has a longer wavelength than the visible light and thus the sizes of concaves and convexes on the surface of the imaging target are likely to be less than or equal to the wavelength of the sub-terahertz wave. For this reason, in the case where the direction of a sub-terahertz wave that enters the imaging target is limited to one direction, or the like, the direction of a reflected wave by the imaging target is also limited, and thus only a limited amount of the reflected wave by the imaging target travels toward the direction of a detector. On the other hand, in the aspect, the imaging target is irradiated with sub-terahertz waves at various angles, and reflected waves resulting from mirror reflection by the imaging target are also reflected at various angles, and thus each sub-terahertz wave mostly travels toward the direction of a detector even after the sub-terahertz wave is mirror-reflected on the surface of the imaging target. Thus, the imaging apparatus according to the aspect is capable of efficiently irradiating the imaging target with the sub-terahertz wave.

In addition, since the imaging space is covered by the at least one side out of the both sides of the pathway by the reflector of the diffuse-reflector, it is difficult for visible light from outside of the diffuse-reflector to enter the imaging space when the diffuse-reflector does not include any visible light transmissive area. For this reason, when the imaging target is a human who passes through the imaging space for imaging is more likely to have a cooped-up feeling. In contrast, by means of the diffuse-reflector including the visible light transmissive area, visible light from outside the diffuse-reflector enters the imaging space. In this way, the imaging apparatus according to this aspect is capable of reducing the cooped-up feeling of the human who passes through the imaging space for imaging.

In addition, for example, the visible light transmissive area may be in a region in which the reflector is located. For example, the reflector may: include a sub-terahertz wave reflective member having a sheet shape which diffusely reflects a sub-terahertz wave and transmits visible light; and transmit visible light.

In this way, it is possible to achieve the imaging apparatus which includes the diffuse-reflector having the reflector which diffusely reflects the sub-terahertz wave and transmits the visible light. For this reason, since the area that diffusely reflects the sub-terahertz wave and the visible light transmissive area are located on the same reflector, it is possible to reduce the cooped-up feeling of the human when the imaging target is the human without reducing the irradiation efficiency of the sub-terahertz wave onto the imaging target.

In addition, for example, the sub-terahertz wave reflective member may be a conductive thin film.

In this way, it is possible to easily manufacture the sub-terahertz wave reflective member which diffusely reflects the sub-terahertz and transmits the visible light.

In addition, for example, the sub-terahertz wave reflective member may be a conductive mesh.

In this way, it is possible to easily manufacture the sub-terahertz wave reflective member which diffusely reflects the sub-terahertz and transmits the visible light.

In addition, for example, the sub-terahertz wave reflective member may be a punched metal.

In this way, it is possible to easily manufacture the sub-terahertz wave reflective member which diffusely reflects the sub-terahertz and transmits the visible light.

In addition, for example, the reflector may further include at least one visible light transmissive member which transmits a sub-terahertz wave and visible light. At least one main surface out of two main surfaces of the sub-terahertz wave reflective member may be covered by the at least one visible light transmissive member. The at least one visible light transmissive member may include a flat surface at a side of the at least one visible light transmissive member. The side is opposite to a sub-terahertz wave reflective member side of the at least one visible light transmissive member. The flat surface may constitute a surface of the reflector.

In this way, the main surface of the sub-terahertz wave reflective member is protected by the visible light transmissive member. Furthermore, since the surface of the reflector is configured with the flat surface, it is easy to clean the reflector.

In addition, for example, both the two main surfaces may be covered by the at least one visible light transmissive member having the flat surface.

In this way, since the both sides of the sub-terahertz wave reflective member are covered by the visible light transmissive member, the visibility of the object in the case where the object is seen through the reflector increases.

In addition, for example, the reflector may further cover the imaging space at least partly from above.

In this way, since the reflector is also located above the imaging space, the sub-terahertz wave emitted from the light source onto the reflector remains within the imaging space more significantly.

In addition, for example, the visible light transmissive area may be an area in which a gap in the diffuse-reflector is located. The gap may be located above the imaging space, and a width of the gap may be smaller than a height of the diffuse-reflector from the pathway.

In this way, the visible light transmissive area is formed by only forming the gap in the diffuse-reflector, the diffuse-reflector having the visible light transmissive area can be easily manufactured. In addition, since the width of the gap is smaller than the height of the diffuse-reflector from the pathway although the gap is formed in the diffuse-reflector, the sub-terahertz wave entered the imaging space does not leak much from the gap.

In addition, for example, the gap may extend in a direction in which the pathway extends, and the width of the gap may be smaller than a width of the pathway.

In this way, the sub-terahertz wave entered the imaging space does not leak much from the gap even when the gap is formed in the diffuse-reflector.

In addition, for example, the imaging apparatus may further include a lighting fixture which emits visible light to the imaging space via the visible light transmissive area.

In this way, when the imaging target is the human, the visible light from the lighting fixture is emitted onto the human, and it is further possible to reduce the cooped-up feeling of the human.

An imaging apparatus according to an aspect of the present disclosure includes a diffuse-reflector which covers an imaging space on a pathway that an imaging target passes through, from at least a side out of both sides of the pathway, and includes a reflector which diffusely reflects a sub-terahertz wave; a light source which emits a sub-terahertz wave onto the reflector; and a detector which receives a reflected wave of the sub-terahertz wave which has been emitted from the light source, diffusely reflected by the reflector, and reflected by the imaging target, and detects an intensity of the reflected wave received. The reflector reflects visible light from the imaging space.

Like the imaging apparatus, the imaging apparatus according to the aspect is also capable of efficiently irradiating the imaging target with the sub-terahertz wave.

In addition, for example, the reflector may include: a sub-terahertz wave reflective member having a sheet shape which diffusely reflects a sub-terahertz wave; and a visible light diffuse-reflective member which transmits a sub-terahertz wave and diffusely reflects visible light. An imaging space side main surface of the sub-terahertz wave reflective member may be covered by the visible light diffuse-reflective member. The visible light diffuse-reflective member may include a visible light diffuse-reflective surface which is flat and diffusely reflects visible light, at a side of the visible light diffuse-reflective member. The side is opposite to a sub-terahertz wave reflective member side of the visible light diffuse-reflective member. The visible light diffuse-reflective surface may constitute an imaging space side surface of the reflector.

In this way, the main surface of the sub-terahertz wave reflective member is protected by the visible light diffuse-reflective member. Furthermore, since the visible light diffuse-reflective surface is flat, it is easy to clean the reflector.

Furthermore, (i) a projector which projects an image or a video or (ii) a lighting fixture which emits illumination light, or the like is further provided for the visible light diffuse-reflective surface. Thus, when the imaging target is the human who passes through the imaging space, the human can see the image or the video, the illumination light, or the like. For this reason, the cooped-up feeling of the human who passes through the imaging space for imaging can be reduced.

In addition, for example, the visible light diffuse-reflective member may include a crystalline resin material.

In this way, it is possible to easily manufacture the visible light diffuse-reflective member which transmits the sub-terahertz wave and diffusely reflects the visible light.

In addition, for example, the visible light diffuse-reflective member may include visible light diffusive particles.

In this way, it is possible to easily manufacture the visible light diffuse-reflective member which transmits the sub-terahertz wave and diffusely reflects the visible light.

In addition, for example, may further include a projector which projects an image or a video onto the visible light diffuse-reflective surface.

In this way, when the imaging target is the human who passes through the imaging space, the human can see the image or the video projected on the visible light diffuse-reflective surface. For this reason, the cooped-up feeling of the human who passes through the imaging space for imaging can be reduced.

In addition, for example, the reflector may include: a sub-terahertz wave reflective member having a sheet shape which diffusely reflects a sub-terahertz wave; and a visible light mirror-reflective member which transmits a sub-terahertz wave and mirror-reflects visible light. An imaging space side main surface of the sub-terahertz wave reflective member may be covered by the visible light mirror-reflective member. The visible light mirror-reflective member may include a visible light mirror-reflective surface which is flat and mirror-reflects visible light, at a side of the visible light mirror-reflective member. The side is opposite to a sub-terahertz wave reflective member side of the visible light mirror-reflective member. The visible light mirror-reflective surface may constitute an imaging space side surface of the reflector.

In this way, the main surface of the sub-terahertz wave reflective member is protected by the visible light mirror-reflective member. Furthermore, since the visible light diffuse-reflective surface is flat, it is easy to clean the reflector.

In addition, since the imaging space side surface of the reflector is configured with the visible light mirror-reflective surface, a mirror image is formed on the imaging space side surface of the reflector, and thus when the imaging target is the human who passes through the imaging space, the cooped-up feeling of the human who passes through the imaging space for imaging can be reduced.

In addition, for example, the visible light mirror-reflective member may include a dielectric multi-layer film.

In this way, it is possible to easily manufacture the visible light mirror-reflective member which transmits the sub-terahertz wave and diffusely reflects the visible light.

In addition, for example, the reflector may sandwich the imaging space from the both sides of the pathway.

In this way, since the imaging space is sandwiched by the reflector, the sub-terahertz wave emitted from the light source is diffusely reflected by the reflector one or more times and enters the imaging target. In addition, the sub-terahertz wave emitted from the light source onto the reflector is repeatedly diffusedly reflected by the reflector, and mostly remains within the imaging space. Thus, the imaging apparatus is capable of onto the imaging target irradiating the imaging target with the sub-terahertz wave more efficiently.

In addition, for example, the diffuse-reflector may have a structure in which a width of the pathway is smallest in an opening part in the diffuse-reflector. The opening part is an entrance to and an exit from the imaging space.

In this way, the sub-terahertz wave entered the imaging space does not leak much from the opening part.

In addition, for example, the imaging apparatus may further include a door which covers an opening part in the diffuse-reflector. The opening part is an entrance to and an exit from the imaging space. The door diffusely may reflect a sub-terahertz wave and transmit visible light.

In this way, since the door diffusely reflects the sub-terahertz wave, the sub-terahertz wave entered the imaging space does not leak much from the opening part.

In addition, since the visible light enters the imaging space through the door, when the imaging target is the human who passes through the imaging space for imaging, the cooped-up feeling of the human can be reduced.

In addition, for example, the imaging apparatus may further include a door which may cover an opening part in the diffuse-reflector. The opening part is an entrance to and an exit from the imaging space. The door may diffusely reflect a sub-terahertz wave and reflect visible light.

In this way, since the door diffusely reflects the sub-terahertz wave, the sub-terahertz wave entered the imaging space does not leak much from the opening part.

Hereinafter, embodiments are described specifically with reference to the drawings.

Each of the embodiments described hereinafter indicates a general or specific example. It is to be noted that the numerical values, the shapes, the materials, the elements, the arrangement and connection of the elements, the steps, the order of the steps, etc., described in the following embodiments are mere examples, and do not intend to limit the present disclosure.

In addition, in the DESCRIPTION, the terms such as "parallel" indicating the relationship between elements, the terms such as "planar board" indicating the shape of an element, and the numerical ranges are expressions which do not indicate precise meaning only and which encompass and cover the substantially equivalent ranges, for example, different by approximately several percent.

In addition, each of the drawings is not always illustrated precisely. Throughout the drawings, substantially the same elements are assigned with the same reference signs, and overlapping descriptions are omitted or simplified.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, certain exemplary embodiments are described in greater detail with reference to the accompanying Drawings.

Each of the exemplary embodiments described below shows a general or specific example. The numerical values, shapes, materials, elements, the arrangement and connection of the elements, steps, the processing order of the steps etc. shown in the following exemplary embodiments are mere examples, and therefore do not limit the scope of the appended Claims and their equivalents. Therefore, among the elements in the following exemplary embodiments, those not recited in any one of the independent claims are described as optional elements.

Embodiment 1

First, an imaging apparatus according to Embodiment 1 is described.

FIG. 1 is a schematic diagram illustrating an appearance of imaging apparatus 10 according to this embodiment. In FIG. 1, elements other than diffuse-reflector 20 are not illustrated.

As illustrated in FIG. 1, imaging apparatus 10 is an imaging apparatus which, for example, irradiates human 100 with a sub-terahertz wave when human 100 passes through a space enclosed by diffuse-reflector 20, and captures an image based on a reflected wave of the sub-terahertz wave reflected by human 100. In addition, for example, imaging apparatus 10 images dangerous objects such as a blade that human 100 conceals below clothes or the like and carries. Each of the dangerous objects such as the blade, etc., that human 100 conceals below clothes or the like and carries is one example of the imaging target.

Figure 2:
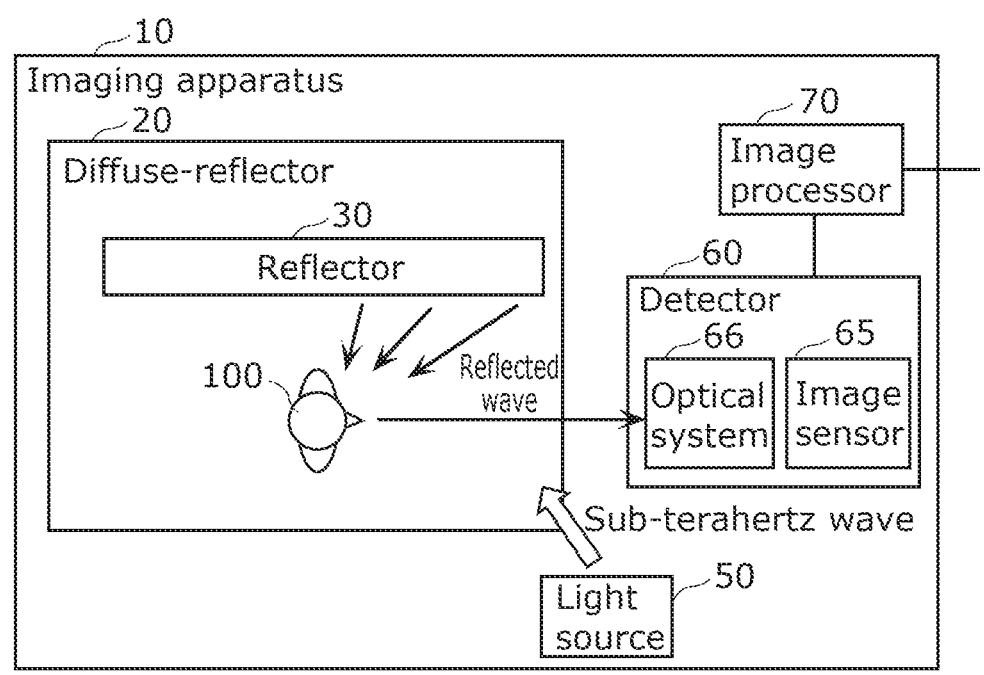
FIG. 2 is a block diagram illustrating a configuration of an imaging apparatus according to Embodiment 1.
Figure 3:
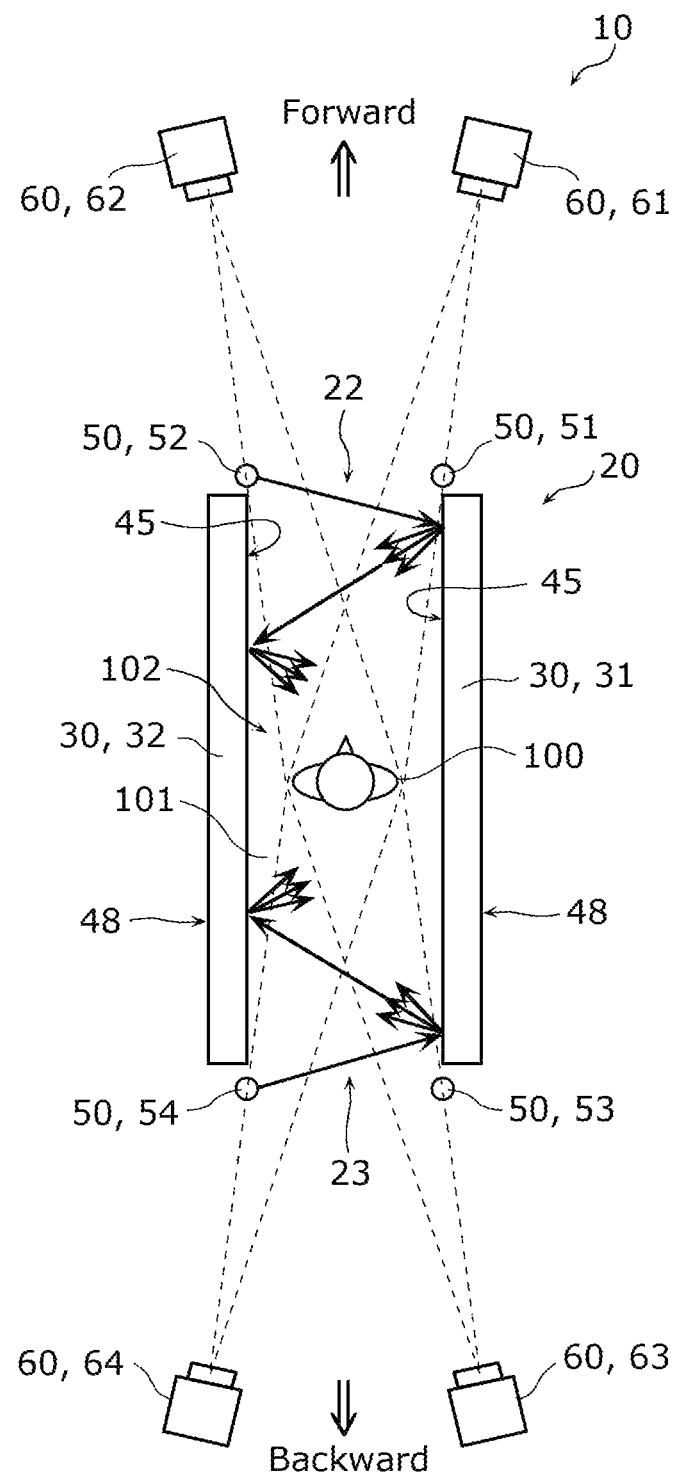
FIG. 3 is a schematic diagram illustrating the imaging apparatus according to Embodiment 1 when seen from above.
Figure 4:
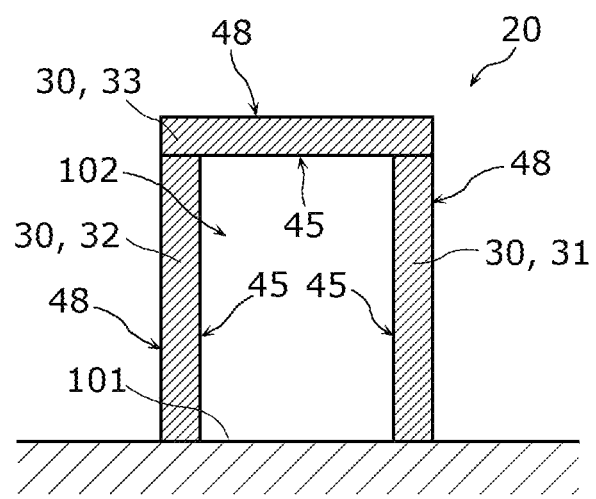
FIG. 4 is a schematic diagram illustrating a cross-sectional structure of a diffuse-reflector according to Embodiment 1.

Hereinafter, details of each of the elements of imaging apparatus 10 are described with reference to FIGS. 2 to 4. FIG. 2 is a block diagram illustrating a configuration of imaging apparatus 10 according to this embodiment. In addition, FIG. 3 is a schematic diagram illustrating imaging apparatus 10 according to this embodiment when seen from above. In addition, FIG. 3 is a diagram in the case where diffuse-reflector 20 is illustrated in a top perspective view, specifically, a diagram in which reflector 33 to be described later is not illustrated. FIG. 3 illustrates how human 100 passes through inside of diffuse-reflector 20. In addition, FIG. 3 illustrates, by arrows, examples of the travel directions of the sub-terahertz wave emitted from light source 50. FIG. 4 is a schematic diagram illustrating a cross-sectional structure of diffuse-reflector 20. FIG. 4 illustrates a cross section of diffuse-reflector 20 when cut in the vertical direction by a line perpendicular to the direction in which pathway 101 extends in a top view. In FIG. 4, specific configurations of reflectors 30 are not illustrated for clear vision. This also applies to the reflector in each of FIGS. 7, 10, 13, 14, 15, 17, and 18 which are diagrams each illustrating a cross-sectional structure of the diffuse-reflector for use in the descriptions indicated below.

Imaging apparatus 10 includes: diffuse-reflector 20 having reflectors 31, 32, and 33; light sources 51, 52, 53, and 54; detectors 61, 62, 63, and 64; and image processor 70. In this DESCRIPTION, reflectors 31, 32, and 33 may be collectively referred to as reflectors 30. This also applies to reflectors 30a, 30b, 30c, 30d, 30e, 30f, and 30g. Likewise, light sources 51, 52, 53, and 54 may be collectively referred to light sources 50. Likewise, detectors 61, 62, 63, and 64 may be collectively referred to detectors 60.

Diffuse-reflector 20 has, for example, a tunnel shape that allows human 100 to pass through the inside thereof. As illustrated in FIG. 4, diffuse-reflector 20 has a U-shape with an angular cross section. Diffuse-reflector 20 needs to be disposed such that reflector 30 is located at at least one side out of the both sides of human 100 who passes through pathway 101. The cross section of diffuse-reflector 20 may be any one of an I-shape, a J-shape, an L-shape, two I-shapes, a U-shape, a C-shape, a frame shape, a circle shape, or another shape. In the inside of diffuse-reflector 20, imaging space 102 which is a space for imaging human 100 is formed above pathway 101 that human 100 passes through. Imaging space 102 is a space covered by reflector 30 out of the space above pathway 101. Diffuse-reflector 20 includes reflector 30. Diffuse-reflector 20 further includes a visible light transmissive area that transmits visible light between inside and outside of diffuse-reflector 20. In this embodiment, the visible light transmissive area is located in a region in which reflector 30 is located. In this way, visible light from diffuse-reflector 20 enters imaging space 102. For this reason, the cooped-up feeling of human 100 who passes through imaging space 102 for imaging can be reduced. In addition, since the visible light transmissive area is located in the region in which reflector 30 is located, the area in which a sub-terahertz wave is diffusely reflected and the visible light transmissive area are located on identical reflector 30. For this reason, it is possible to reduce the cooped-up feeling of human 100 without reducing the irradiation efficiency of the sub-terahertz wave onto human 100. In this embodiment, the visible light transmissive area may be the entirety or a part of the region in which reflector 30 is located.

Reflector 30 included in diffuse-reflector 20 covers the space above pathway 101 that human 100 passes through, specifically imaging space 102, from at least one side out of the both sides of pathway 101. Covering from the at least one side out of the both sides of pathway 101 means covering from the at least one of the both sides which are two vertical directions relative to the direction in which pathway 101 extends. In this embodiment, diffuse-reflector 20 includes three reflectors 31, 32, and 33 which diffusely reflect the sub-terahertz wave. Reflectors 30 (specifically, reflectors 31 and 32) sandwich imaging space 102 above pathway 101 that human 100 passes through from the both sides of pathway 101. In other words, reflector 30 covers imaging space 102 from the both sides of pathway 101. In addition, reflector 30 (specifically, reflector 33) covers imaging space 102 from above, and reflectors 30 enclose imaging space 102. Imaging space 102 is a space sandwiched by the inner surface of reflector 30 out of the space above pathway 101. In this way, by means of reflector 30 that diffusely reflects a sub-terahertz wave standing from the floor at the both sides and sandwiching imaging space 102, the sub-terahertz wave that entered imaging space 102 is repeatedly diffusely reflected by reflectors 30 located at the both sides of pathway 101 and mostly remains within imaging space 102. The width and height of imaging space 102 are constant, but at least one of the width or height of imaging space 102 may be partly different.

Reflector 31 and reflector 32 are arranged to face each other across imaging space 102. In other words, reflector 31 and reflector 32 are arranged to have a positional relationship in which reflector 31 and reflector 32 sandwich pathway 101 in a top view. In addition, reflector 31 and reflector 32 are arranged to be parallel to each other. Reflector 31 and reflector 32 each stand from the floor at a side of pathway 101 and constitutes a side wall of diffuse-reflector 20. The height of each of reflector 31 and reflector 32 from pathway 101 is not particularly limited, and for example is in a range from 1.5 m to 5.0 m, inclusive. Reflector 33 is located above imaging space 102. Reflector 33 is joined at the upper end of each of reflector 31 and reflector 32. Reflector 33 constitutes the ceiling of diffuse-reflector 20. Reflectors 31, 32, and 33 each have a planar shape. Reflectors 31, 32, and 33 may each have a curved planar shape. The plan-view shape of each of reflectors 31, 32, and 33 is not particularly limited, and is a rectangular shape, for example. It is to be noted that diffuse-reflector 20 may further include reflector 30 which constitutes the floor part of diffuse-reflector 20 and is located below imaging space 102. Alternatively, reflector 30 does not always need to cover imaging space 102 from above, and, for example, diffuse-reflector 20 does not always need to include reflector 33. Alternatively, diffuse-reflector 20 does not always need to include three reflectors 31, 32, and 33, and, for example, may include only reflector 31 or reflector 32 among three reflectors 31, 32, and 33.

Reflector 30 diffusely reflects a sub-terahertz wave. Specifically, reflector 30 diffusely reflects a sub-terahertz wave that enters from at least the imaging space 102 side (that is, the inside of diffuse-reflector 20). As illustrated in FIG. 3, the sub-terahertz wave emitted from light source 50 is diffusely reflected by reflector 30 one or more times, and human 100 is irradiated with the reflected waves of the sub-terahertz waves. In addition, reflector 30 transmits visible light. For example, reflector 30 transmits 5% or more of visible light that enters from the thickness direction of reflector 30. Reflector 30 may transmits 30% or more or 50% or more of visible light that enters from the thickness direction of reflector 30.

Next, a specific configuration of reflector 30 is described.

Figure 5:
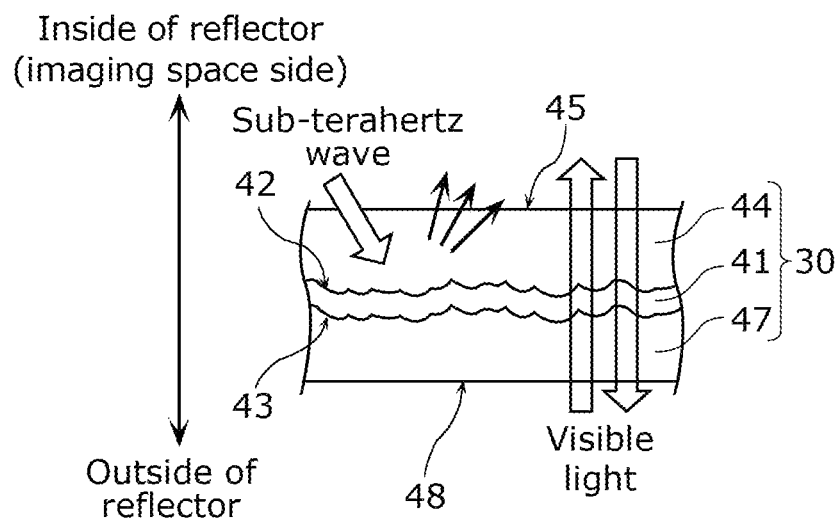
FIG. 5 is a schematic diagram illustrating a cross-sectional structure of a reflector according to Embodiment 1.

FIG. 5 is a schematic diagram illustrating a cross-sectional structure of diffuse-reflector 30. FIG. 5 is a diagram in which a part of the cross section of reflector 30 is enlarged. It is to be noted that, in FIG. 5, diagonal hatching indicating a cross section is not illustrated for clear vision.

Reflector 30 includes sub-terahertz wave reflective member 41, visible light transmissive member 44, and visible light transmissive member 47. Reflector 30 has a structure in which visible light transmissive member 44, sub-terahertz wave reflective member 41, visible light transmissive member 47 are stacked in stated order from an imaging space 102 side.

Sub-terahertz wave reflective member 41 is a sheet-shaped member which diffusely reflects a sub-terahertz wave. In addition, sub-terahertz wave reflective member 41 transmits visible light. Sub-terahertz wave reflective member 41 may transmit 5% or more or 50% or more of visible light that enters from the thickness direction of reflector 30.

Sub-terahertz wave reflective member 41 is located between visible light transmissive member 44 and visible light transmissive member 47. Sub-terahertz wave reflective member 41 has two main surfaces 42 and 43 as two front surfaces when seen from the thickness direction of sub-terahertz wave reflective member 41. Main surfaces 42 and 43 are each concave-convex surface which diffusely reflects a sub-terahertz wave. When reflector 30 sandwiches imaging space 102, main surfaces 42 and 43 also sandwich imaging space 102. Main surface 42 is located at the imaging space 102 side of sub-terahertz wave reflective member 41, and main surface 43 is located at the side opposite to the imaging space 102 side of sub-terahertz wave reflective member 41. Both two main surfaces 42 and 43 of sub-terahertz wave reflective member 41 are respectively covered by visible light transmissive members 44 and 47. Specifically, main surface 42 located at the imaging space 102 side of sub-terahertz wave reflective member 41 is covered by visible light transmissive member 44, and main surface 43 located at the side opposite to the imaging space 102 side of sub-terahertz wave reflective member 41 is covered by visible light transmissive member 47. For this reason, main surfaces 42 and 43 do not constitute the surface of reflector 30, and are not exposed. In this way, when main surfaces 42 and 43 each of which is the concave-convex surface are exposed, the concave-convex surface affects visibility in the case where an object is seen through reflector 30, but the object can be viewed more clearly by covering main surfaces 42 and 43 respectively by visible light transmissive members 44 and 47. In addition, main surfaces 42 and 43 which are the concave-convex surfaces are protected.

In each of main surfaces 42 and 43 which are the concave-convex surfaces, for example, average length RSm of a roughness curve element that is greater than or equal to the wavelength of a sub-terahertz wave that is emitted from light source 50. Specifically, for example, main surfaces 42 and 43 have an average length RSm of a roughness curve element that is in a range from 0.15 mm to 0.3 mm, inclusive. In this way, the sub-terahertz wave is efficiently diffusely reflected by main surfaces 42 and 43. In the example illustrated, the concave-convex shapes of main surfaces 42 and 43 match each other. The concave-convex shapes of main surfaces 42 and 43 may be different from each other. In addition, main surface 42 at the imaging space 102 side of sub-terahertz wave reflective member 41 needs to be a concave-convex surface, but it is also excellent that main surface 43 is a flat surface.

Sub-terahertz wave reflective member 41 is configured with a conductive member having a visible light transmittivity. Specifically, sub-terahertz wave reflective member 41 is, for example, a conductive thin film, a conductive mesh, or a punched metal. In this way, it is possible to easily manufacture sub-terahertz wave reflective member 41 which diffusely reflects a sub-terahertz wave and transmits visible light.

Examples of the conductive oxide are listed as follows: a transparent conductive oxide such as ITO (Indium Tin Oxide), IZO (InZnO; Indium Zinc Oxide), AZO (AlZnO: Aluminum Zinc Oxide), FTO (Florine-doped Tin Oxide), $SnO_2$, $TiO_2$, and $ZnO_2$.

In addition, the conductive thin film may be made of a pure metal (single metal) including at least one of copper, aluminum, nickel, iron, stainless, silver, gold, platinum, or the like, or an alloy, etc. The conductive thin film may be a metal thin film having a thickness that allows transmission of visible light. The metal thin film is designed to have a thickness that allows transmission of visible light and reflection of a sub-terahertz wave, based on a skin thickness.

The conductive mesh may be a fabric of thready conductive material such as a metal mesh, or a fabric plated by a conductive material such as metal. Examples of conductive materials that can be used for a conductive mesh include: a pure metal (single metal) including at least one of copper, aluminum, nickel, iron, stainless, silver, gold, platinum, or the like, or an alloy, etc.

The openings of the conductive mesh have a diameter, for example, in a range from the wavelength of visible light to the wavelength of a sub-terahertz wave, inclusive. Specifically, the openings of the conductive mesh have a diameter, for example, in a range from 500 nm to 6 mm, inclusive.

As a punched metal, a punched metal in which holes are formed by punting a sheet-shaped metal is used for example. Examples of metals that can be used for the punched metal include: a pure metal (single metal) including at least one of copper, aluminum, nickel, iron, stainless, silver, gold, platinum, or the like, or an alloy, etc. The holes in the punched metal are, for example, round holes, rectangular holes, or long holes. Each hole of the punched metal has a diameter, for example, in a range from the wavelength of visible light to the wavelength of a sub-terahertz wave, inclusive. Specifically, the holes of the punched metal has a maximum diameter, for example, in a range from 500 nm to 6 mm, inclusive. The punched metal is only required to be designed to have a hole pitch according to a desired transmittivity of visible light.

Visible light transmissive member 44 and visible light transmissive member 47 each transmit a sub-terahertz wave. For example, visible light transmissive member 44 and visible light transmissive member 47 each transmit 50% or more of a sub-terahertz wave that enters from the thickness direction of reflector 30. For example, visible light transmissive member 44 and visible light transmissive member 47 may each transmit 80% or more or 90% or more of a sub-terahertz wave that enters from the thickness direction of reflector 30. Visible light transmissive member 44 and visible light transmissive member 47 each transmit a visible light. For example, visible light transmissive member 44 and visible light transmissive member 47 each transmit 50% or more of visible light that enters from the thickness direction of reflector 30. For example, visible light transmissive member 44 and visible light transmissive member 47 may each transmit 80% or more or 90% or more of visible light that enters from the thickness direction of reflector 30.

Visible light transmissive member 44 is located at the imaging space 102 side of sub-terahertz wave reflective member 41, and covers main surface 42. Visible light transmissive member 44 has flat surface 45 at the side opposite to the sub-terahertz wave reflective member 41 side of visible light transmissive member 44. Flat surface 45 constitutes a surface of reflector 30. Flat surface 45 is the surface at the imaging space 102 side (that is, the inner side) in reflector 30. In this way, even when human 100 who passes through imaging space 102 collides with the inner surface of reflector 30, human 100 is prevented from colliding with the concave-convex surface (that is main surface 42) of sub-terahertz wave reflective member 41, and human 100 and main surface 42 are protected. In addition, since the inner surface of reflector 30 is flat surface 45, it is easy to clean reflector 30.

Visible light transmissive member 47 is located at the side opposite to the imaging space 102 side of sub-terahertz wave reflective member 41, and covers main surface 43. Visible light transmissive member 47 has flat surface 48 at the side opposite to the sub-terahertz wave reflective member 41 side of visible light transmissive member 47. Flat surface 48 constitutes an outer surface of reflector 30 at the side opposite to the imaging space 102 side of reflector 30. Since the outer surface of reflector 30 is flat surface 48, it is easy to clean reflector 30.

Flat surfaces 45 and 48 are parallel to each other. In reflector 30, flat surface 45, main surface 42, main surface 43, and flat surface 48 are arranged in order from the imaging space 102 side along the thickness direction of reflector 30.

As a material that is used for visible light transmissive members 44 and 47, a transparent dielectric such as a transparent resin material is used. Examples of transparent resin materials include materials of amorphous resins such as a polycarbonate resin, an acrylic resin, an epoxy resin, a silicone resin, and a polystyrene resin. As a transparent resin material, a crystalline resin having a crystal size equal to or smaller than a visible light wavelength. For example, the same material is used for visible light transmissive members 44 and 47. In this way, since the refractive indices of visible light transmissive members 44 and 47 are equal, an object when seen through reflector 30 can be seen more clearly. Different materials may be used for visible light transmissive members 44 and 47.

When sub-hertz wave reflective member 41 is a conductive thin film, reflector 30 is formed, for example, using a method indicated below. Visible light transmissive member 44 is formed by firstly forming a resin material using a mold having a concave-convex surface, or by performing machine processing on a plate-shaped resin material to form concaves and convexes on the surface of the resin material, and the film of sub-terahertz wave reflective member 41 is formed on the formed cover visible light transmissive member 44, by vapor deposition, spraying, or the like. Next, film-formed sub-terahertz wave reflective member 41 is covered by applying, hot-melt pasting, or the like of a transparent resin material of visible light transmissive member 47, so as to obtain reflector 30. When sub-terahertz wave reflective member 41 is a metal mesh or a punched metal, reflector 30 is obtained by performing machine processing on the metal mesh or the punched metal to form concaves and convexes on the surface of the metal mesh or the punched metal, covering the metal mesh or the punched metal with the concaves and convexes by, for example, applying, hot-melt pasting, insert-molding a transparent resin material that is a material for visible light transmissive members 44 and 47. Alternatively, visible light transmissive members 44 and 47 may be formed using a 3D printer.

As described above, as illustrated in FIG. 5, the sub-terahertz wave that enters from the imaging space 102 side onto reflector 30 enters visible light transmissive member 44, is diffusely reflected on main surface 42 of sub-terahertz wave reflective member 41, and exits, via flat surface 45, to the imaging space 102 side at various angles. In addition, the visible light that enters from outside onto reflector 30 passes through visible light transmissive member 47, sub-terahertz wave reflective member 41, and visible light transmissive member 44 in stated order, and exits to the imaging space 102 side via flat surface 45. In addition, the visible light that enters from the imaging space 102 side onto reflector 30 passes through visible light transmissive member 44, sub-terahertz wave reflective member 41, and visible light transmissive member 47 in stated order, and exits to outside reflector 30 via flat surface 48.

It is to be noted that reflectors 31, 32, and 33 may be mutually the same in configuration and material, or may be different in at least one of configuration or material. Diffuse-reflector 20 may include one reflector 30 in which reflectors 31, 32, and 33 are integrated and which sandwiches imaging space 102, instead of including three reflectors 31, 32, and 33. Alternatively, any of reflectors 31, 32, and 33 may be a reflector which does not transmit visible light and diffusely reflects a sub-terahertz wave.

Elements other than diffuse-reflector 20 included in imaging apparatus 10 are described with reference to FIGS. 2 and 3 again.

Light source 50 is a light source which emits a sub-terahertz wave onto reflector 30. Specifically, light source 50 emits a sub-terahertz wave onto flat surface 45 which is the inner surface of reflector 30. In this way, the sub-terahertz wave enters imaging space 102. In addition, as illustrated in FIG. 3, light source 50 emits the sub-terahertz wave onto reflector 30 so that a part of the sub-terahertz wave emitted by light source 50 is diffusely reflected by reflector 30 two or more times. In addition, the part of the sub-terahertz wave emitted by light source 50 may directly enter human 100.

Light source 50 is located around opening parts 22 and 23 of diffuse-reflector 20, and is apart from diffuse-reflector 20. Light source 50 is located between diffuse-reflector 20 and detector 60. In this way, it is easy for a reflected wave of sub-terahertz wave emitted inside imaging space 102 and reflected by human 100 to enter detector 60. Light source 50 is supported by, a supporting member, or the like which is not illustrated in the drawings. As for the arrangement of light source 50, it is only necessary that light source 50 be disposed at a position at which light source 50 can emit a sub-terahertz wave onto reflector 30. For example, light source 50 may be located inside diffuse-reflector 20, or may be located at the side opposite to the diffuse-reflector 20 side of detector 60.

In this embodiment, imaging apparatus 10 includes four light sources 51, 52, 53, and 54. The number of light sources 50 is not particularly limited, and may be any of one to three, or five or more. Light sources 51 and 52 are located forward of diffuse-reflector 20 in the direction in which pathway 101 extends. Light sources 53 and 54 are located backward of diffuse-reflector 20 in the direction in which pathway 101 extends. In other words, diffuse-reflector 20 is located between light sources 51 and 52 and light sources 53 and 54. Hereinafter, the forward direction in the direction in which pathway 101 extends may be simply referred to as "forward", and the backward direction in the direction in which pathway 101 extends may be simply referred to as "backward". In addition, in the DESCRIPTION, the "forward direction" and "backward direction" are terms which do not refer to the forward and backward in the movement direction of human 100 on pathway 101 but refer to relative directions. Specifically, one direction out of the directions in the direction in which pathway 101 extends is referred to as the "forward direction", and the other direction that is opposite to the one direction is referred to as the "backward direction".

Light sources 51 and 52 emit a sub-terahertz wave onto reflector 30 from forward of diffuse-reflector 20, and light sources 53 and 54 emit a sub-terahertz wave onto reflector 30 from backward of diffuse-reflector 20.

For example, light source 50 includes point light sources which emit a sub-terahertz wave to a surrounding area of light source 50. In addition, light source 50 may be a line light source which extends along an end part of reflector 30 in the direction in which pathway 101 extends and emits a sub-terahertz wave. For example, light source 50 is implemented by a light source, or the like which includes a publicly-known sub-terahertz wave generating element.

It is to be noted that light source 50 may be a plurality of point light sources which are arranged along an end part of reflector 30 in the direction in which pathway 101 extends.

Detector 60 receives a reflected wave of a sub-terahertz wave which has been emitted from light source 50, diffusely reflected by reflector 30, and reflected by human 100. Detector 60 detects the intensity of the reflected wave received. Specifically, detector 60 generates an image based on the intensity of the reflected wave received. Detector 60 outputs the generated image to image processor 70. Image generating by detector 60 is also referred to as "imaging or image capturing". Detector 60 is located at forward and backward of diffuse-reflector 20.

In this embodiment, imaging apparatus 10 includes four detectors 61, 62, 63, and 64. The number of detectors 60 is not particularly limited, and may be any of one to three, or five or more. Detectors 61 and 62 are located at forward of diffuse-reflector 20. Detectors 63 and 64 are located at backward of diffuse-reflector 20. In other words, diffuse-reflector 20 is located between detectors 61 and 62 and detectors 63 and 64. Detectors 61 and 62 each capture an image which is of a front side surface of human 100, and detectors 63 and 64 each capture an image which is of a back side surface of human 100. In addition, detector 60 is supported by, a supporting member, or the like which is not illustrated in the drawings.

Detector 60 includes image sensor 65 and optical system 66.

Image sensor 65 receives a reflected wave of a sub-terahertz wave which has been emitted from light source 50, diffusely reflected by reflector 30, and reflected by human 100. Image sensor 65 detects the intensity of the reflected wave received, and generates an image based on the intensity detected. Specifically, image sensor 65 converts an image of the sub-terahertz wave reflected from the imaging target into an electrical signal according to the intensity. Image sensor 65 then generates an image based on the electrical signal converted. The image generated by image sensor 65 is output to image processor 70.

The sub-terahertz wave is mirror-reflected on a human, a metal, and the like, and passes through clothes, bags, etc. For this reason, image sensor 65 receives a reflected wave which has been mirror-reflected (i) on a body part of human 100 and (ii) from an area included within an angle range in which image sensor 65 can receive the sub-terahertz wave. For example, a reflected wave by human 100 which passes through a range indicated by broken lines in FIG. 3 enters image sensor 65. In addition, when human 100 conceals and caries a blade, or the like, image sensor 65 receives a reflected wave which has been mirror-reflected (i) by the blade concealed and carried and (ii) from the area included within an angle range in which image sensor 65 can receive the sub-terahertz wave.

Image sensor 65 is configured with, for example, pixels each including a detector element for a sub-terahertz wave, a peripheral circuit, etc.

Optical system 66 receives a reflected wave of a sub-terahertz wave which has been emitted from light source 50, diffusely reflected by reflector 30, and reflected by human 100. Optical system 66 is configured to, for example, include at least one lens. It is to be noted that detector 60 does not always need to include optical system 66, and that a reflected wave may directly enter image sensor 65.

Upon receiving an image from detector 60, image processor 70 outputs the received image to outside, and together with the output, performs image processing onto the received image, and then outputs the result of the image processing to outside.

The image processing that is performed by image processor 70 may be, for example, a process of determining whether the image output from detector 60 includes an object having a predetermined feature (for example, an object having a feature of a blade), and when determining that the image output from detector 60 includes an object having a predetermined feature, outputting a predetermined detection signal (for example, an alert indicating that an image of the object having the feature of the blade has been captured). For example, image processor 70 includes a processor and a memory, and is implemented by means of the processor executing the program recorded on the memory.

It is to be noted that imaging apparatus 10 does not always include image processor 70, and detector 60 may output an image to an external image processing apparatus. Alternatively, the function of image processor 70 may be provided to each detector 60.

Here, action effects provided by imaging apparatus 10 according to this embodiment are described with reference to mainly FIG. 3. The sub-terahertz wave (indicated by arrows in FIG. 3) emitted from light source 50 onto reflectors 30 is diffusely reflected by reflectors 30 and enter human 100 because imaging space 102 is covered by reflectors 30 from the sides of imaging space 102. In this way, a surface of reflector 30, that is, the entirety of flat surface 45 functions as a surface light source, and a comparatively wide surface range of human 100 is irradiated with sub-terahertz waves at various angles. Thus, imaging apparatus 10 is capable of efficiently irradiating human 100 with the sub-terahertz waves. In addition, in this embodiment, since imaging space 102 is sandwiched by reflector 30, the sub-terahertz wave emitted from light source 50 is diffusely reflected by reflector 30 one or more times and enters human 100. In addition, the sub-terahertz wave emitted from light source 50 onto reflector 30 is repeatedly diffusely reflected by reflectors 30 located at the both sides of pathway 101, and mostly remains within imaging space 102. Thus, human 100 is irradiated with the reflected waves of the sub-terahertz wave at various angles. Thus, imaging apparatus 10 is capable of efficiently irradiating human 100 with the sub-terahertz wave.

Furthermore, since the comparatively wide surface range of human 100 is irradiated with the sub-terahertz waves at the various angles, reflected waves of the sub-terahertz waves reflected on the comparatively wide surface range in human 100 enter image sensor 65 of detector 60. For example, a reflected wave of a sub-terahertz wave reflected by almost entirety of the front surface of human 100 enters image sensor 65 of detector 60 located forward of diffuse-reflector 20. In addition, since the sub-terahertz wave emitted from light source 50 onto reflector 30 mostly remains within imaging space 102, a large amount of the reflected wave enters image sensor 65 of detector 60. For this reason, the image quality of the image to be generated by detector 60 increases. This results in, for example, increase in the detection accuracy in the case where imaging apparatus 10 detects a dangerous object such as a blade that human 100 conceals and carries.

In addition, diffuse-reflector 20 further includes a visible light transmissive area that transmits visible light. Since reflector 30 transmits visible light, in diffuse-reflector 20, the visible light transmissive area is located in a region in which reflector 30 is located. Since reflector 30 stands from the floor at the both sides of pathway 101, when diffuse-reflector 20 does not include any visible light transmissive area, it is difficult for visible light from outside diffuse-reflector 20 to enter imaging space 102. In addition, the outside of diffuse-reflector 20 cannot be seen from imaging space 102, and thus, for example, human 100 who passes through imaging space 102 cannot see senary that is outside diffuse-reflector 20. For this reason, human 100 who passes through imaging space 102 for imaging is more likely to have a cooped-up feeling. In contrast, by means of diffuse-reflector 20 including the visible light transmissive area, visible light from outside diffuse-reflector 20 enters imaging space 102. In addition, the outside of diffuse-reflector 20 can be seen from imaging space 102, and thus, for example, human 100 who passes through imaging space 102 can see senary that is outside diffuse-reflector 20. In this way, imaging apparatus 10 is capable of reducing the cooped-up feeling of human 100 who passes through imaging space 102 for imaging. In addition, imaging apparatus 10 can visually recognize human 100 who passes through imaging space 102 from outside diffuse-reflector 20 through reflector 30.

Embodiment 2

Next, an imaging apparatus according to Embodiment 2 is described.

The imaging apparatus according to Embodiment 2 is mainly different from the imaging apparatus according to Embodiment 1 in the point of including a reflector which reflects visible light. The differences from Embodiment 1 are mainly described hereinafter, and descriptions of the common points are omitted or simplified.

Figure 6:
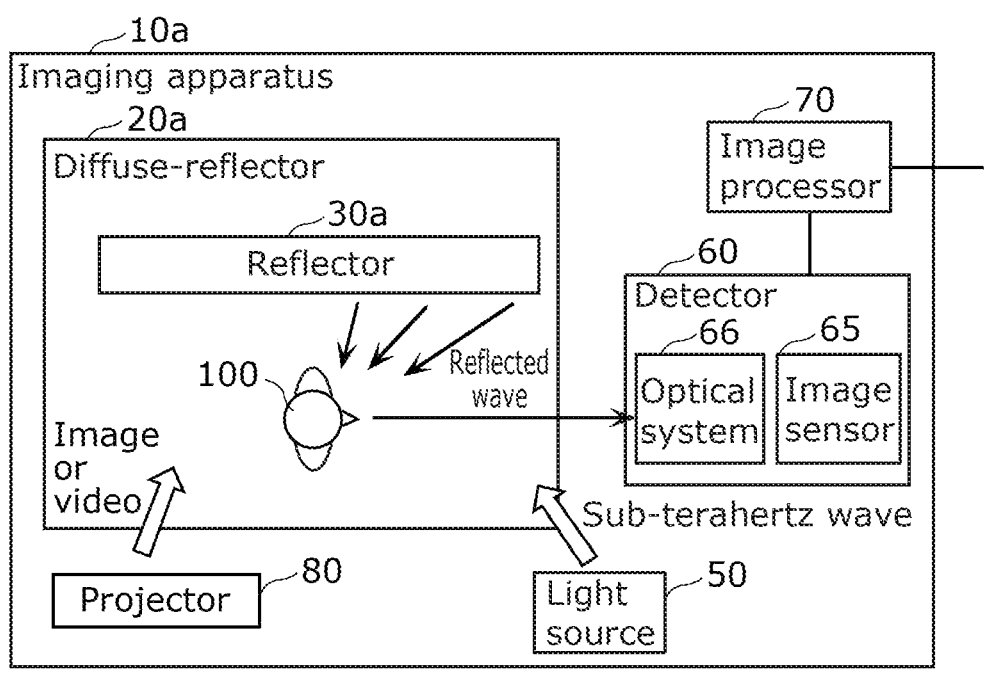
FIG. 6 is a block diagram illustrating a configuration of an imaging apparatus according to Embodiment 2.
Figure 7:
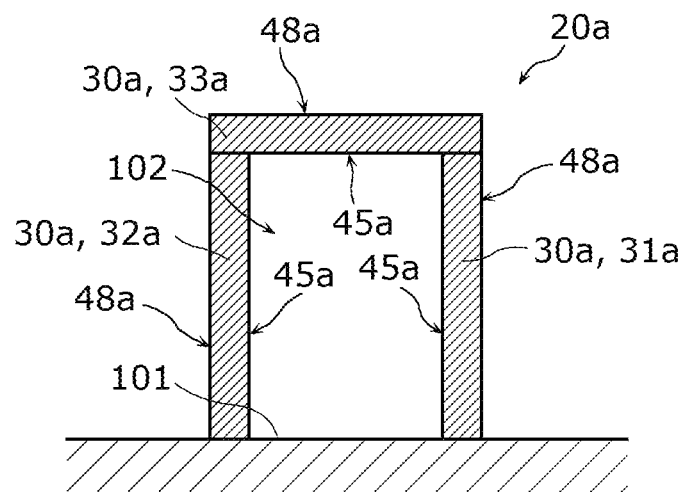
FIG. 7 is a schematic diagram illustrating a cross-sectional structure of a diffuse-reflector according to Embodiment 2.

FIG. 6 is a block diagram illustrating a configuration of imaging apparatus 10a according to this embodiment. FIG. 7 is a schematic diagram illustrating a cross-sectional structure of diffuse-reflector 20a. FIG. 7 illustrates a cross section of diffuse-reflector 20a when cut in the vertical direction by a line perpendicular to the direction in which pathway 101 extends in a top view. Imaging apparatus 10a is different from imaging apparatus 10 according to Embodiment 1 in the point of including diffuse-reflector 20a that includes reflector 30a instead of including diffuse-reflector 20 that includes reflector 30. In addition, imaging apparatus 10a is different from imaging apparatus 10 according to Embodiment 1 in the point of further including projector 80.

As illustrated in FIGS. 6 and 7, imaging apparatus 10a includes diffuse-reflector 20a including reflector 30a, light source 50, detector 60, imaging processor 70, and projector 80. The positional relationship, etc., of respective elements in imaging apparatus 10a when seen from above are, for example, the same as those of imaging apparatus 10.

Reflector 30a included in diffuse-reflector 20a covers imaging space 102 above pathway 101 that human 100 passes through, from at least one of the both sides of pathway 101. In this embodiment, diffuse-reflector 20a includes three reflectors 31a, 32a, and 33a. Like diffuse-reflector 20, diffuse-reflector 20a has, for example, a tunnel shape that allows human 100 to pass through the inside thereof. Reflectors 30a (specifically, reflectors 31a and 32a) sandwich imaging space 102 above pathway 101 that human 100 passes through from the both sides of pathway 101. In addition, reflector 30a (specifically, reflector 33a) covers imaging space 102 from above, and reflectors 30a enclose imaging space 102.

Reflector 31a and reflector 32a are arranged to face each other across imaging space 102. Reflector 31a and reflector 32a are arranged to be parallel to each other. Reflector 31a and reflector 32a each stand from the floor at a side of pathway 101 and form a side wall of diffuse-reflector 20a. The height of each of reflector 31a and reflector 32a from pathway 101 is not particularly limited, and for example is in a range from 1.5 m to 5.0 m, inclusive. Reflector 33a is located above imaging space 102. Reflector 33a is joined at the upper end of each of reflector 31a and reflector 32a. Reflector 33a constitutes the ceiling of diffuse-reflector 20a. Reflectors 31a, 32a, and 33a each have a planar shape. Reflectors 31a, 32a, and 33a may each have a curved planer shape. Although the plan-view shape of each of reflectors 31a, 32a, and 33a is not particularly limited, the plan-view shape is a rectangular shape, for example. It is to be noted that diffuse-reflector 20a may further include reflector 30a which is located below imaging space 102 and constitutes the floor part of diffuse-reflector 20a. Alternatively, reflector 30a does not always need to cover imaging space 102 from above, and, for example, diffuse-reflector 20a does not always need to include reflector 33a. Alternatively, diffuse-reflector 20a does not always need to include three reflectors 31a, 32a, and 33a, and, for example, may include only reflector 31a or reflector 32a among three reflectors 31a, 32a, and 33a.

Reflector 30a diffusely reflects a sub-terahertz wave. Specifically, reflector 30a diffusely reflects the sub-terahertz wave that enters from at least the imaging space 102 side (that is, the inside of diffuse-reflector 20a). In addition, reflector 30a reflects, specifically diffusely reflects visible light from the imaging space 102 side.

Figure 8:
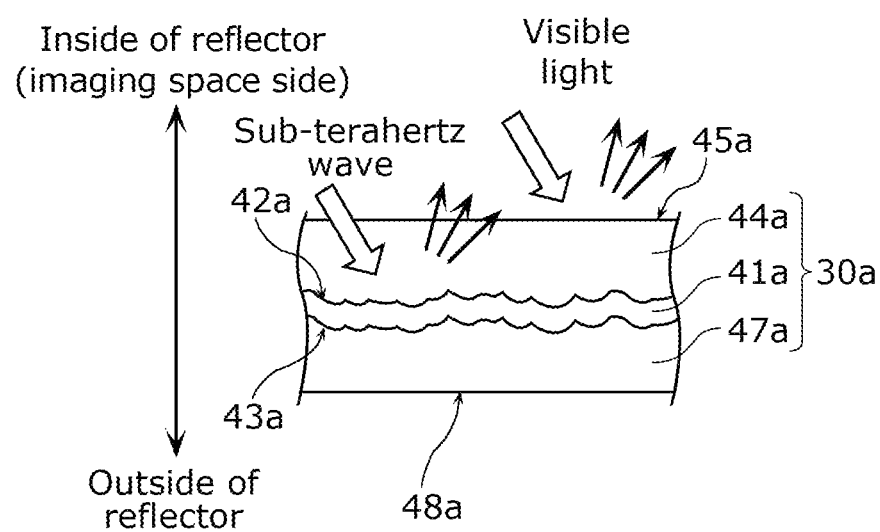
FIG. 8 is a schematic diagram illustrating a cross-sectional structure of a reflector according to Embodiment 2.

FIG. 8 is a schematic diagram illustrating a cross-sectional structure of reflector 30a. FIG. 8 is a diagram in which a part of the cross section of reflector 30a is enlarged. It is to be noted that, in FIG. 8, diagonal hatching indicating a cross section is not illustrated for clear vision.

Reflector 30a includes sub-terahertz wave reflective member 41a, visible light diffuse-reflective member 44a, and cover member 47a. Reflector 30a has a structure in which visible light diffuse-reflective member 44a and cover member 47a are stacked from the imaging space 102 side in stated order.

Sub-terahertz wave reflective member 41a is a sheet-shaped member which diffusely reflects a sub-terahertz wave. Sub-terahertz wave reflective member 41a may or may not transmit visible light.

Sub-terahertz wave reflective member 41a is located between visible light diffuse-reflective member 44a and cover member 47a. Sub-terahertz wave reflective member 41a has two main surfaces 42a and 43a as two front surfaces when seen from the thickness direction of sub-terahertz wave reflective member 41a. When reflector 30a sandwiches imaging space 102, main surfaces 42a and 43a also sandwich imaging space 102. Main surface 42a is located at the imaging space 102 side of sub-terahertz wave reflective member 41a, and main surface 43a is located at the side opposite to the imaging space 102 side of sub-terahertz wave reflective member 41a. Main surface 42a located at the imaging space 102 side of sub-terahertz wave reflective member 41a is covered by visible light diffuse-reflective member 44a. Main surface 43a located at the side opposite to the imaging space 102 side of sub-terahertz wave reflective member 41a is covered by cover member 47a.

Main surfaces 42a and 43a are each concave-convex surface which diffusely reflects a sub-terahertz wave, like main surfaces 42 and 43 according to Embodiment 1.

Sub-terahertz wave reflective member 41a is configured with, for example, the same conductive member such as a metal and a conductive oxide as the conductive member used for sub-terahertz wave reflective member 41. Sub-terahertz wave reflective member 41a may be configured with a metal foil, or the like which does not transmit visible light.

Visible light diffuse-reflective member 44a transmits a sub-terahertz wave. Visible light diffuse-reflective member 44a transmits, for example, 50% or more of a sub-terahertz wave that enters from the thickness direction of reflector 30a. Visible light diffuse-reflective member 44a transmits, for example, 80% or more or 90% or more of a sub-terahertz wave that enters from the thickness direction of reflector 30a. In addition, Visible light diffuse-reflective member 44a diffusely reflects visible light from the imaging space 102 side.

Visible light diffuse-reflective member 44a is located at the imaging space 102 side of sub-terahertz wave reflective member 41a, and covers main surface 42a. Visible light diffuse-reflective member 44a has visible light diffuse-reflective surface 45a that is flat and is located at the side opposite to the sub-terahertz wave reflective member 41a side of visible light diffuse-reflective member 44a. Visible light diffuse-reflective surface 45a constitutes an imaging space 102 side surface of reflector 30a. In this way, it becomes possible to project an image or a video onto the imaging space 102 side surface of reflector 30a, using projector 80 or the like. In addition, since visible light diffuse-reflective surface 45a is a flat surface, it is easy to clean reflector 30a. In addition, even when human 100 who passes through imaging space 102 collides with the inner surface of reflector 30a, human 100 is prevented from colliding with the concave-convex surface (that is main surface 42a) of sub-terahertz wave reflective member 41a, and human 100 and main surface 42a are protected.

As a material that is used for visible light diffuse-reflective member 44a, a crystalline resin material which diffusely reflects visible light is used. Examples of crystalline resin materials include fluorine resins such as polytetrafluoroethylene, a high-density polyethylene resin, or the like. For example, visible light diffuse-reflective member 44a includes a crystalline resin material as a main component. In addition, visible light diffuse-reflective member 44a may include visible light diffusive particles such as glass beads. Specifically, a member obtained by applying visible light diffusive particles such as glass beads to the imaging space 102 side surface of a resin material (for example, one of the amorphous resin materials described above) which does not diffusely reflect visible light, or for example a resin material in which visible light diffusive particles such as glass beads are dispersed may be used for visible light diffuse-reflective member 44a.

Cover member 47a is located at the imaging space 102 side of sub-terahertz wave reflective member 41a, and covers main surface 43a. Cover member 47a includes flat surface 48a at the side opposite to the sub-terahertz wave reflective member 41a of cover member 47a. Flat surface 48a constitutes the outer surface at the side opposite to the imaging space 102 side of reflector 30a. Since the outer surface of reflector 30a is flat surface 48a, it is easy to clean reflector 30a.

The material for cover member 47a is only required to be a material with which cover member 47a can be configured to have and maintain the shape of cover member 47a. As the material for cover member 47a, a resin material, a metal, or the like is used for example.

Reflector 30a is formed by, for example, changing a material used in the method of forming reflector 30 according to Embodiment 1 to the material described above.

As illustrated in FIG. 8, with the above-described configuration, the sub-terahertz wave that enters reflector 30a from the imaging space 102 side enters visible light diffuse-reflective member 44a, is diffusely reflected on main surface 42a of sub-terahertz wave reflective member 41a, and exits to the imaging space 102 side via visible light diffuse-reflective surface 45a at various angles. In addition, the visible light that enters reflector 30a from the imaging space 102 side is diffusely reflected by visible light diffuse-reflective surface 45a.

It is to be noted that reflectors 31a, 32a, and 33a which are reflectors 30a may be mutually the same in configuration and material, or may be different in at least one of configuration or material. In addition, diffuse-reflector 20a may include one reflector 30a in which reflectors 31a, 32a, and 33a are integrated and which sandwiches imaging space 102, instead of three reflectors 31a, 32a, and 33a. In addition, any one of reflector 31a, 32a, or 33a may be a reflector which does not diffusely reflect visible light and diffusely reflects a sub-terahertz wave.

Elements other than diffuse-reflector 20a of imaging apparatus 10a are described with reference to FIG. 6 again.

Projector 80 projects an image or a video onto visible light diffuse-reflective surface 45a of reflector 30a. Projector 80 projects, for example, an image or a video of a geometric pattern, an image or a video of natural senary, or another video. The image or the video that is projected by projector 80 may be a still image or a moving image. In this way, by means of projector 80 projecting an image or a video onto visible light diffuse-reflective surface 45a, human 100 who passes through imaging space 102 can see the image or the video that is projected on visible light diffuse-reflective surface 45a. In this way, imaging apparatus 10a is capable of reducing the cooped-up feeling of human 100 who passes through imaging space 102 for imaging.

As described above, since imaging space 102 is sandwiched by reflector 30a, imaging apparatus 10a according to this embodiment also efficiently irradiates human 100 with a sub-terahertz wave, like imaging apparatus 10 according to Embodiment 1.

Variation 1

Next, an imaging apparatus according to Variation 1 of Embodiment 2 is described.

The imaging apparatus according to Variation 1 of Embodiment 2 is mainly different from the imaging apparatus according to Embodiment 2 in the point of including a reflector which mirror-reflects visible light. The differences from Embodiments 1 and 2 are mainly described hereinafter, and descriptions of the common points are omitted or simplified.

Figure 9:
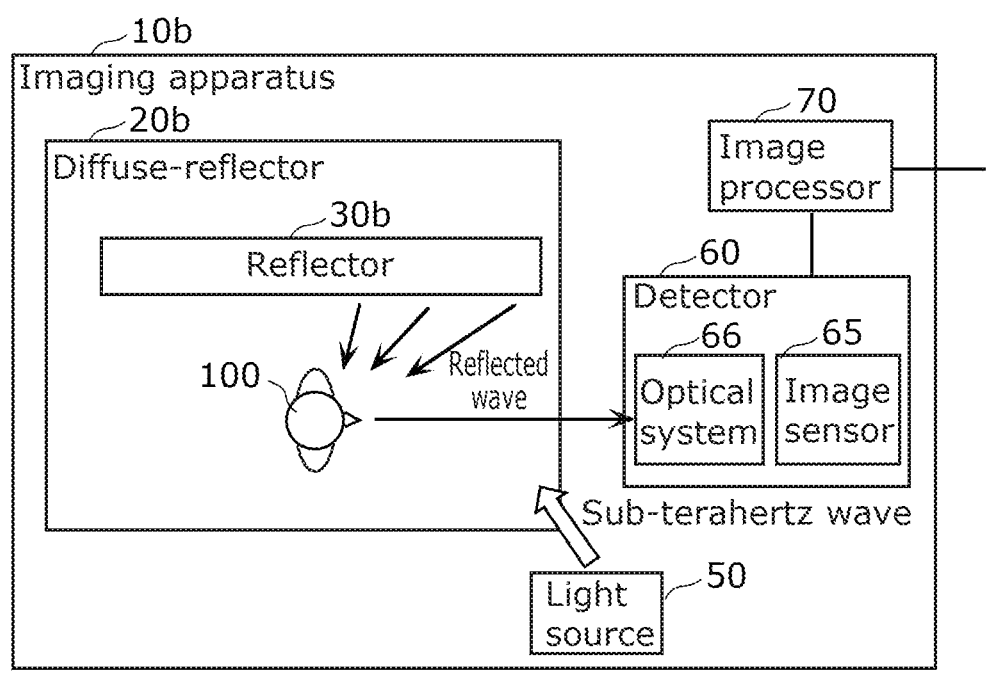
FIG. 9 is a block diagram illustrating a configuration of an imaging apparatus according to Variation 1 of Embodiment 2.
Figure 10:
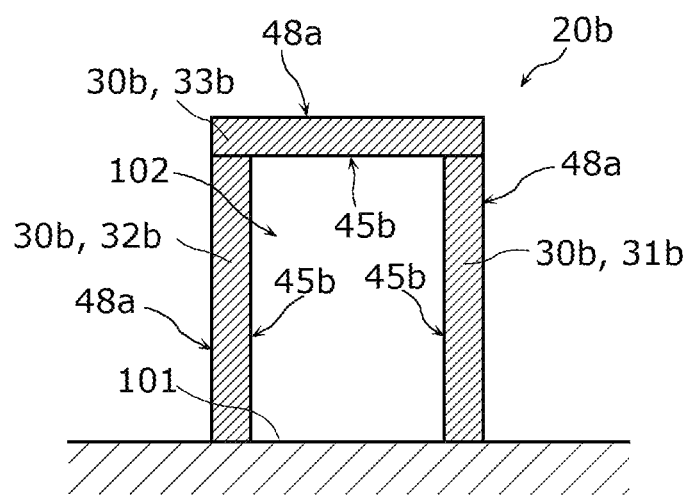
FIG. 10 is a schematic diagram illustrating a cross-sectional structure of a diffuse-reflector according to Variation 1 of Embodiment 2.

FIG. 9 is a block diagram illustrating a configuration of imaging apparatus 10b according to this variation. FIG. 10 is a schematic diagram illustrating a cross-sectional structure of diffuse-reflector 20b. FIG. 10 illustrates a cross section of diffuse-reflector 20b when cut in the vertical direction by a line perpendicular to the direction in which pathway 101 extends in a top view. Imaging apparatus 10b is different from imaging apparatus 10a according to Embodiment 2 in the point of including diffuse-reflector 20b that includes reflector 30b instead of including diffuse-reflector 20a that includes reflector 30a. In addition, imaging apparatus 10b is different from imaging apparatus 10a according to Embodiment 2 in the point of not including projector 80.

As illustrated in FIGS. 9 and 10, imaging apparatus 10b includes: diffuse-reflector 20b including reflector 30b; light source 50; detector 60; and image processor 70. The positional relationship, etc., of respective elements in imaging apparatus 10b when seen from above are, for example, the same as those of imaging apparatus 10.

Reflector 30b included in diffuse-reflector 20b covers imaging space 102 above pathway 101 that human 100 passes through, from at least one side out of the both sides of pathway 101. In this variation, diffuse-reflector 20b includes three reflectors 31b, 32b, and 33b. Like diffuse-reflector 20 and diffuse-reflector 20a, diffuse-reflector 20b has, for example, a tunnel shape that allows human 100 to pass through the inside thereof. Reflectors 30b (specifically, reflectors 31b and 32b) sandwich imaging space 102 above pathway 101 that human 100 passes through from the both sides of pathway 101. In addition, reflector 30b (specifically, reflector 33b) covers imaging space 102 from above and reflectors 30b enclose imaging space 102.

Reflectors 31b and 32b are arranged to face each other across imaging space 102. Reflector 31b and reflector 32b are arranged to be parallel to each other. Reflector 31b and reflector 32b each stand from the floor at a side of pathway 101 and constitute a side wall of diffuse-reflector 20b. The height of each of reflector 31b and reflector 32b from pathway 101 is not particularly limited, and for example is in a range from 1.5 m to 5.0 m, inclusive. Reflector 33b is located above imaging space 102. Reflector 33b is joined at the upper end of each of reflector 31b and reflector 32b. Reflector 33b constitutes the ceiling of diffuse-reflector 20b. It is to be noted that diffuse-reflector 20b may further include reflector 30b which is located below imaging space 102 and constitutes the floor part of diffuse-reflector 20b. Alternatively, reflector 30b does not always need to cover imaging space 102 from above, and, for example, diffuse-reflector 20b does not always need to include reflector 33b. In addition, diffuse-reflector 20b does not always need to include three reflectors 31b, 32b, and 33b, and for example, may include only reflectors 31b and 32b among three reflectors 31b, 32b, and 33b.

Reflector 30b diffusely reflects a sub-terahertz wave. Specifically, reflector 30b diffusely reflects the sub-terahertz wave that enters from at least the imaging space 102 side (that is, the inside of diffuse-reflector 20b). In addition, reflector 30b reflects, specifically mirror-reflects visible light from the imaging space 102 side.

Figure 11:
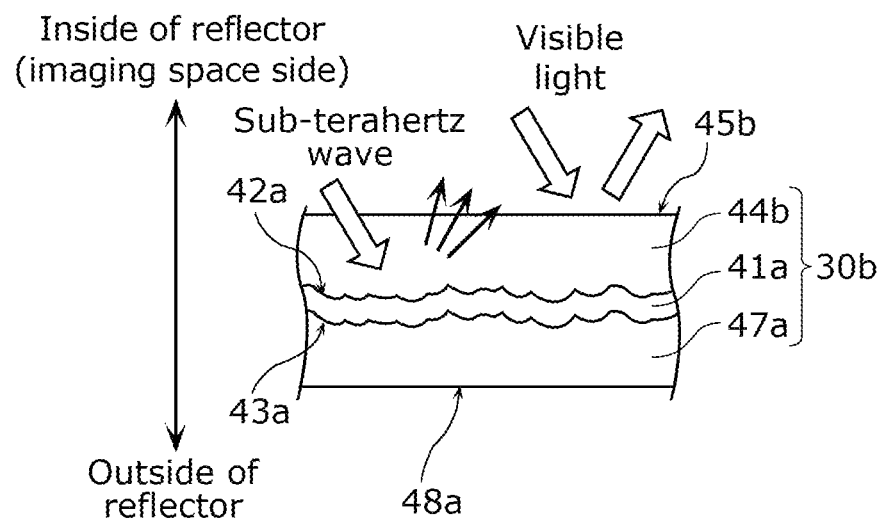
FIG. 11 is a schematic diagram illustrating a cross-sectional structure of a reflector according to Variation 1 of Embodiment 2.

FIG. 11 is a schematic diagram illustrating a cross-sectional structure of reflector 30b. FIG. 11 is a diagram in which a part of the cross section of reflector 30b is enlarged. It is to be noted that, in FIG. 11, diagonal hatching indicating a cross section is not illustrated for clear vision.

Reflector 30b includes sub-terahertz wave reflective member 41a, visible light mirror-reflective member 44b, and cover member 47a. Reflector 30b has a structure in which visible light mirror-reflective member 44b, sub-terahertz wave reflective member 41a, and cover member 47a are stacked in stated order from the imaging space 102 side. In other words, reflector 30b is configured to include visible light mirror-reflective member 44b instead of visible light diffuse-reflective member 44a of reflector 30a according to Embodiment 2.

Sub-terahertz wave mirror-reflective member 44b transmits a sub-terahertz wave. Sub-terahertz wave mirror-reflective member 44b transmits, for example, 50% or more of a sub-terahertz wave that enters from the thickness direction of reflector 30b. Sub-terahertz wave mirror-reflective member 44b transmits, for example, 80% or more or 90% or more of a sub-terahertz wave that enters from the thickness direction of reflector 30b. In addition, sub-terahertz wave mirror-reflective member 44b mirror-reflects visible light from the imaging space 102 side.

Sub-terahertz wave mirror-reflective member 44b is located at the imaging space 102 side of sub-terahertz wave reflective member 41a, and covers main surface 42a. Sub-terahertz wave mirror-reflective member 44b has visible light mirror-reflective surface 45b that is flat and is located at the side opposite to the sub-terahertz wave reflective member 41a side of visible light mirror-reflective member 44b. Visible light mirror-reflective surface 45b constitutes an imaging space 102 side surface of reflector 30b. In this way, since a mirror image is formed on the imaging space 102 side surface of reflector 30b, imaging apparatus 10b is capable of reducing the cooped-up feeling of human 100 who passes through imaging space 102 for imaging. In addition, since visible light mirror-reflective surface 45b is a flat surface, it is easy to clean reflector 30b. In addition, even when human 100 who passes through imaging space 102 collides with the inner surface of reflector 30b, human 100 is prevented from colliding with the concave-convex surface (that is main surface 42a) of sub-terahertz wave reflective member 41a, and human 100 and main surface 42a are protected.

For example, visible light mirror-reflective member 44b includes a dielectric multi-layer film in which layers having different refractive indices are stacked alternately. Specifically, for example, visible light mirror-reflective member 44b is a member obtained by staking a dielectric multi-layer film onto an imaging space 102 side surface of a plate-shaped resin material.

Reflector 30b is formed by, for example, changing a material used in the method of forming reflector 30 according to Embodiment 1 to the material described above.

As illustrated in FIG. 11, with the configuration described above, the sub-terahertz wave that enters from the imaging space 102 side onto reflector 30b enters visible light mirror-reflective member 44b, is diffusely reflected on main surface 42a of sub-terahertz wave reflective member 41a, and exits to the imaging space 102 side via visible light mirror-reflective surface 45b at various angles. In addition, the visible light that enters from the imaging space 102 side onto reflector 30b is mirror-reflected by visible light mirror-reflective surface 45b.

It is to be noted that reflectors 31b, 32b, and 33b may be mutually the same in configuration and material, or may be different in at least one of configuration or material. Alternatively, diffuse-reflector 20b may include one reflector 30b in which reflectors 31b, 32b, and 33b are integrated and which sandwiches imaging space 102, instead of including three reflectors 31b, 32b, and 33b. Alternatively, any of reflectors 31b, 32b, and 33b may be a reflector which does not mirror-reflect visible light and diffusely reflects a sub-terahertz wave.

As described above, since imaging space 102 is sandwiched by reflector 30b, imaging apparatus 10b according to this variation also efficiently irradiates human 100 with a sub-terahertz wave, like imaging apparatus 10 according to Embodiment 1.

Embodiment 3

Next, an imaging apparatus according to Embodiment 3 is described.

The imaging apparatus according to Embodiment 3 is mainly different from imaging apparatuses in Embodiments 1 and 2 in the point that a diffuse-reflector has a gap. The differences from Embodiments 1 and 2 are mainly described hereinafter, and descriptions of the common points are omitted or simplified.

Figure 12:
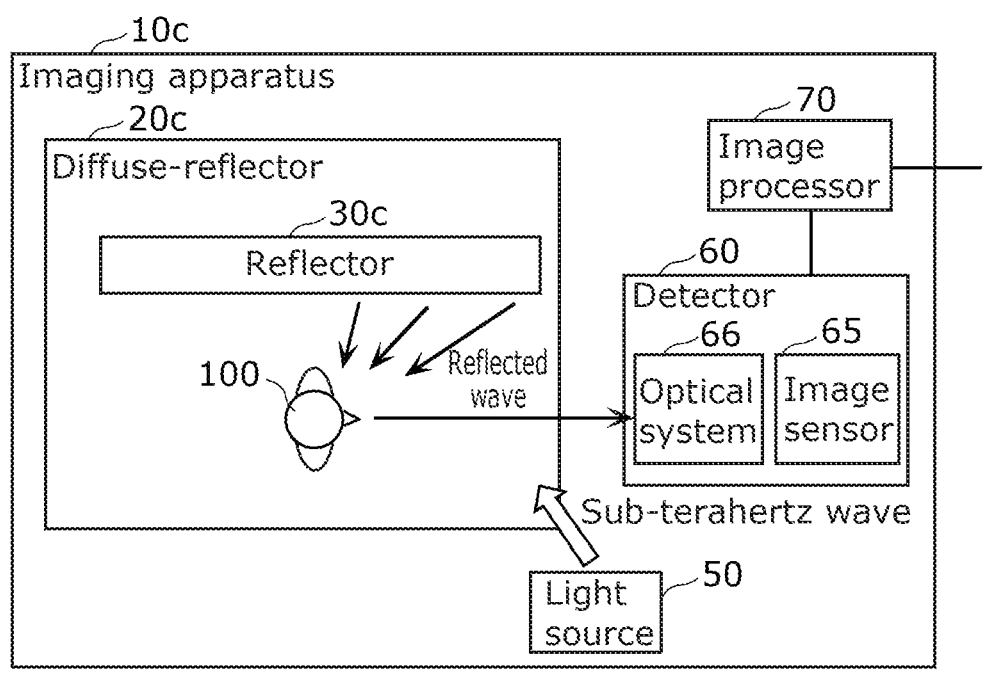
FIG. 12 is a block diagram illustrating a configuration of an imaging apparatus according to Embodiment 3.
Figure 13:
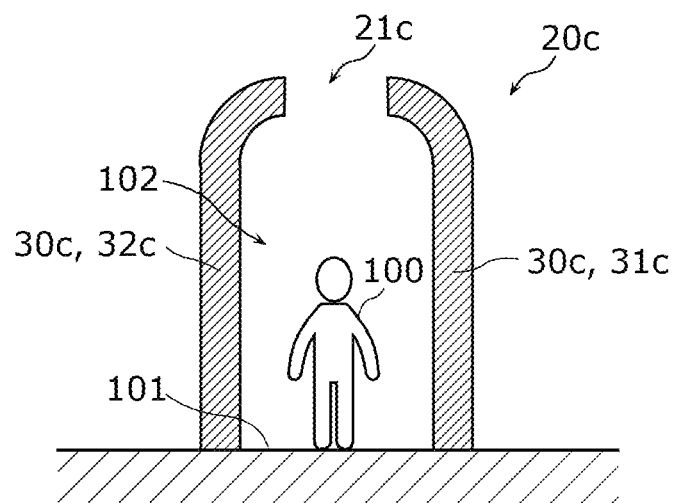
FIG. 13 is a schematic diagram illustrating a cross-sectional structure of a diffuse-reflector according to Embodiment 3.

FIG. 12 is a block diagram illustrating a configuration of imaging apparatus 10c according to this embodiment. FIG. 13 is a schematic diagram illustrating a cross-sectional structure of diffuse-reflector 20c. FIG. 13 illustrates a cross section of diffuse-reflector 20c when cut in the vertical direction by a line perpendicular to the direction in which pathway 101 extends in a top view. Imaging apparatus 10c is different from imaging apparatus 10 according to Embodiment 1 in the point of including diffuse-reflector 20c that includes reflector 30c instead of including diffuse-reflector 20 that includes reflector 30c.

As illustrated in FIGS. 12 and 13, imaging apparatus 10c includes: diffuse-reflector 20c including reflector 30c; light source 50; detector 60; and image processor 70. The positional relationship, etc., of respective elements in imaging apparatus 10c when seen from above are, for example, the same as those of imaging apparatus 10.

Diffuse-reflector 20c includes two reflectors 31c and 32c. Diffuse-reflector 20c further includes a visible light transmissive area that transmits visible light between inside and outside of diffuse-reflector 20c.

Gap 21c is formed between reflector 31c and reflector 32c in diffuse-reflector 20c, specifically between an upper end part of reflector 31c and an upper end part of reflector 32c. In this embodiment, the visible light transmissive area is an area in which gap 21c is located. Gap 21c extends in the direction in which pathway 101 extends. Reflector 21c is located above imaging space 102. The width of gap 21c is smaller than the height of diffuse-reflector 20c from pathway 101. In this way, even gap 21c is formed in diffuse-reflector 20c, the possibility that a sub-terahertz wave that entered imaging space 102 is diffusely reflected by reflector 30c of diffuse-reflector 20c is higher than the possibility that the sub-terahertz wave exits from gap 21c. For this reason, the sub-terahertz wave that entered imaging space 102 does not leak much from gap 21c. In addition, the width of gap 21c is smaller than the width of pathway 101. In this way, even when gap 21c is formed in diffuse-reflector 20c, the sub-terahertz wave that entered imaging space 102 does not leak much from gap 21c. Here, the width is a length in the direction vertical to the direction in which each of gap 21c and pathway 101 extends when diffuse-reflector 20c is seen from above in a top view of pathway 101.

Reflector 30c of diffuse-reflector 20c covers imaging space 102 above pathway 101 that human 100 passes through, from at least one side out of the both sides of pathway 101. In this embodiment, reflectors 30c (specifically, reflectors 31c and 32c) sandwich imaging space 102 above pathway 101 that human 100 passes through from the both sides of pathway 101. In addition, reflector 30c covers imaging space 102 partly from above. Reflectors 31c and 32c are arranged to face each other across imaging space 102. Reflector 31c and reflector 32c each stand from the floor at a side of pathway 101 and constitute a side wall of diffuse-reflector 20c. Reflector 31c and reflector 32c curve toward inward such that the upper end parts thereof become close to each other. In this way, the upper end parts of reflector 31c and reflector 32c cover imaging space 102 partly from above. It is to be noted that diffuse-reflector 20c may further include reflector 30c which is located below imaging space 102 and constitutes the floor part of diffuse-reflector 20c.

Reflector 30c diffusely reflects a sub-terahertz wave. Specifically, reflector 30c diffusely reflects a sub-terahertz wave that enters from at least the imaging space 102 side (that is, the inside of diffuse-reflector 20c).

In addition, imaging apparatus 10c according to this embodiment may include another diffuse-reflector instead of diffuse-reflector 20c.

Figure 14:
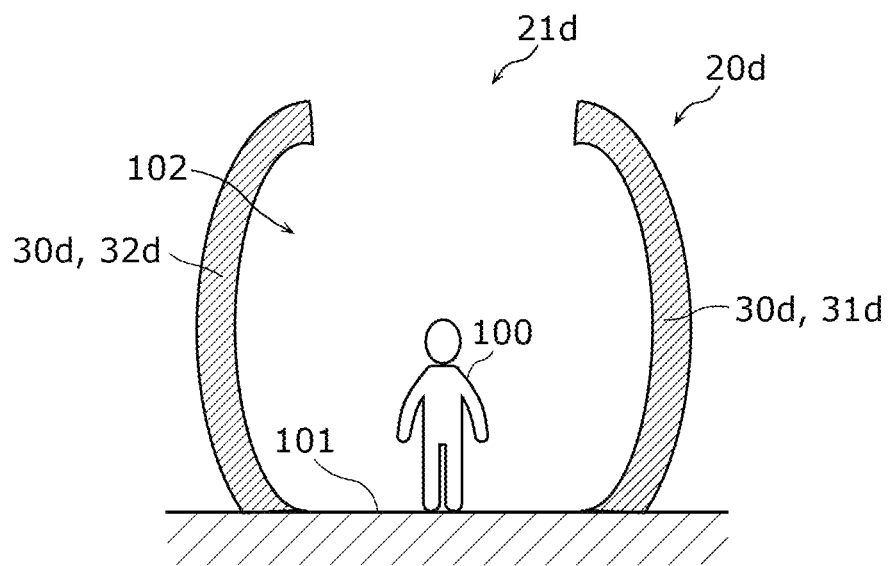
FIG. 14 is a schematic diagram illustrating another example of a cross-sectional structure of a diffuse-reflector according to Embodiment 3.

FIG. 14 is a schematic diagram illustrating a cross-sectional structure of diffuse-reflector 20d which is another example of a diffuse-reflector according to this embodiment. FIG. 14 illustrates a cross section of diffuse-reflector 20d when cut in the vertical direction by a line perpendicular to the direction in which pathway 101 extends in a top view.

As illustrated in FIG. 14, diffuse-reflector 20d includes two reflectors 31d and 32d. In addition, reflector 30d covers imaging space 102 partly from above. Diffuse-reflector 20d includes gap 21d between reflector 31d and reflector 32d. Gap 21d extends in the direction in which pathway 101 extends. Reflector 21d is located above imaging space 102.

Reflectors 31d and 32d are arranged to face each other across imaging space 102. Reflector 31d and reflector 32d each stand from the floor at a side of pathway 101 and constitute a side wall of diffuse-reflector 20d. Reflector 31d and reflector 32d are curved plates which curve toward inward such that the upper end parts and the lower end parts thereof become close to each other.

Reflector 30d diffusely reflects a sub-terahertz wave. Specifically, reflector 30d diffusely reflects the sub-terahertz wave that enters from at least the imaging space 102 side (that is, the inside of diffuse-reflector 20d).

Figure 15:
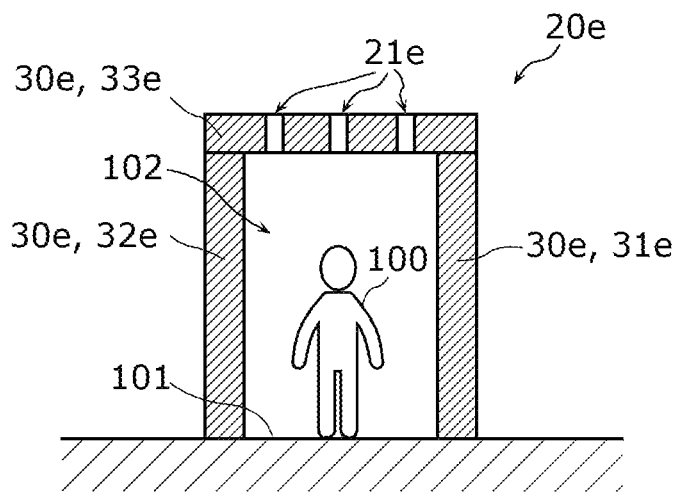
FIG. 15 is a schematic diagram illustrating still another example of a cross-sectional structure of a diffuse-reflector according to Embodiment 3.

FIG. 15 is a schematic diagram illustrating a cross-sectional structure of diffuse-reflector 20e which is another example of a diffuse-reflector according to this embodiment. FIG. 15 illustrates a cross section of diffuse-reflector 20e when cut in the vertical direction by a line perpendicular to the direction in which pathway 101 extends in a top view.

As illustrated in FIG. 15, diffuse-reflector 20e includes three reflectors 31e, 32e, and 33e. Diffuse-reflector 20e includes gap 21e which is a slit formed in reflector 33e. Gap 21e extends in the direction in which pathway 101 extends. Reflector 21e is located above imaging space 102.

Reflectors 31e and 32e are arranged to face each other across imaging space 102. Reflector 31e and reflector 32e each stand from the floor at a side of pathway 101 and constitute a side wall of diffuse-reflector 20e. Reflector 33e is located above imaging space 102. Reflector 33e is joined at the upper end of each of reflector 31e and reflector 32e. Reflector 33e constitutes the ceiling of diffuse-reflector 20e. Reflector 33e covers imaging space 102 from above. Diffuse-reflector 33e includes a slit, as gap 21e, which extends in the direction in which pathway 101 extends. The direction in which the slit extends may be the direction which intersects the direction in which pathway 101 extends.

Reflector 30e diffusely reflects a sub-terahertz wave. Specifically, reflector 30e diffusely reflects a sub-terahertz wave that enters from at least the imaging space 102 side (that is, the inside of diffuse-reflector 20e).

The materials and configurations of reflectors 30c, 30d, and 30e are not particularly limited as long as the materials and configurations can diffusely reflect a sub-terahertz wave to the imaging space side. For example, reflectors 30c, 30d, and 30e may be the same in configuration and material as reflectors 30a and 30b.

As described above, since imaging space 102 is sandwiched by reflector 30c, 30d, or 30e, imaging apparatus 10c according to this embodiment also efficiently irradiates human 100 with a sub-terahertz wave, like imaging apparatus 10 according to Embodiment 1.

In addition, diffuse-reflectors 20c, 20d, and 20e each further include a visible light transmissive area that transmits visible light. The visible light transmissive areas in diffuse-reflectors 20c, 20d, and 20e are areas in which gaps 21c, 21d, and 21e are respectively located. For this reason, imaging apparatus 10c is capable of reducing the cooped-up feeling of human 100 who passes through imaging space 102 for imaging, like imaging apparatus 10 according to Embodiment 1.

In addition, since the visible light transmissive areas are formed by only forming gaps 21c, 21d, and 21e in diffuse-reflectors 20c, 20d, and 20e, it is possible to easily manufacture diffuse-reflectors 20c, 20d, and 20e respectively having the visible light transmissive areas.

Embodiment 4

Next, an imaging apparatus according to Embodiment 4 is described.

The imaging apparatus according to Embodiment 4 is mainly different from the imaging apparatus according to Embodiment 1 in the point of further including a lighting fixture which emits visible light in an imaging space. The differences from Embodiments 1 to 3 are mainly described hereinafter, and descriptions of the common points are omitted or simplified.

Figure 16:
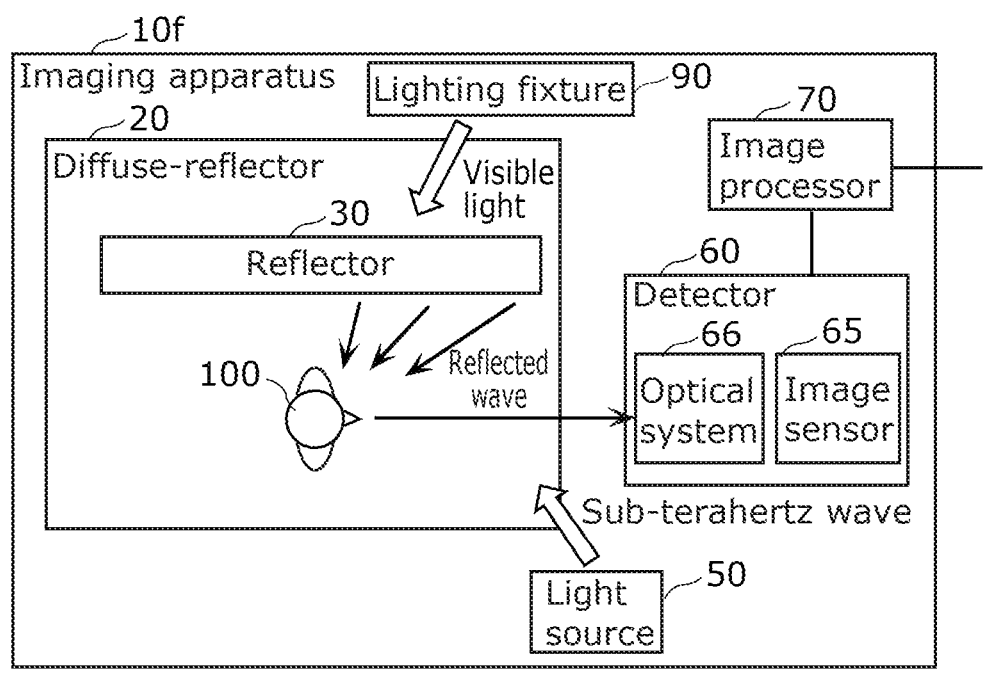
FIG. 16 is a block diagram illustrating a configuration of an imaging apparatus according to Embodiment 4.

FIG. 16 is a block diagram illustrating a configuration of imaging apparatus 10f according to this embodiment. Imaging apparatus 10f is different from imaging apparatus 10 according to Embodiment 1 in the point of further including lighting fixture 90.

As illustrated in FIG. 16, imaging apparatus 10f includes diffuse-reflector 20, light source 50, detector 60, image processor 70, and lighting fixture 90. The positional relationship, etc., of respective elements in imaging apparatus 10f when seen from above are, for example, the same as those of imaging apparatus 10.

Imaging apparatus 10f includes diffuse-reflector 20 according to Embodiment 1, and lighting fixture 90 emits visible light from outside of diffuse-reflector 20.

Figure 17:
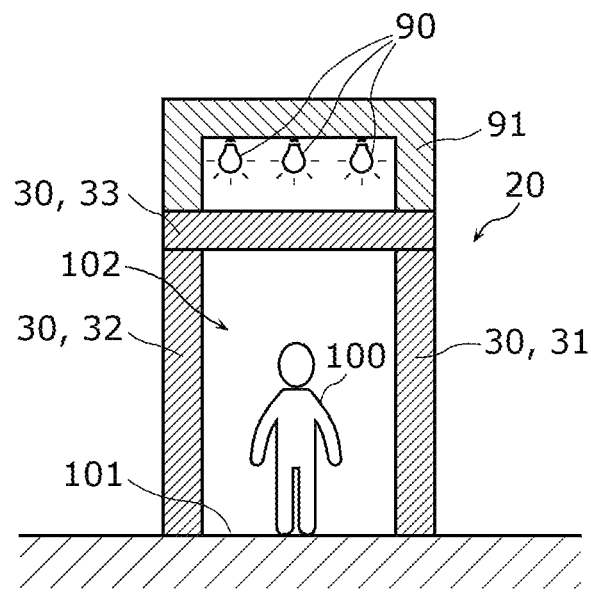
FIG. 17 is a schematic diagram illustrating a cross-sectional structure of a diffuse-reflector according to Embodiment 4 in the case where a lighting fixture is provided above the diffuse-reflector.

FIG. 17 is a schematic diagram illustrating a cross-sectional structure of diffuse-reflector 20 above which lighting fixture 90 is provided. FIG. 17 illustrates a cross section of diffuse-reflector 20 when cut in the vertical direction by a line perpendicular to the direction in which pathway 101 extends in a top view.

As illustrated in FIG. 17, lighting fixture 90 supported by supporting member 91 is provided above diffuse-reflector 20, specifically, above reflector 33. Diffuse-reflector 20 includes a visible light transmissive area above imaging space 102. Lighting fixture 90 emits visible light to imaging space 102 through the visible light transmissive area, from above the visible light transmissive area. As described above, diffuse-reflector 20 includes reflector 30 which transmits visible light. Lighting fixture 90 emits visible light to imaging space 102 through the visible light transmissive area which is located in a region in which reflector 30 (specifically, reflector 33) is located. In this way, since visible light is emitted onto human 100, it is possible to further reduce the cooped-up feeling of human 100.

It is to be noted that lighting fixture 90 may be provided at a position at which visible light is emitted to imaging space 102 through reflectors 31 and 32. In other words, lighting fixture 90 may be located outside of a side of diffuse-reflector 20.

Figure 18:
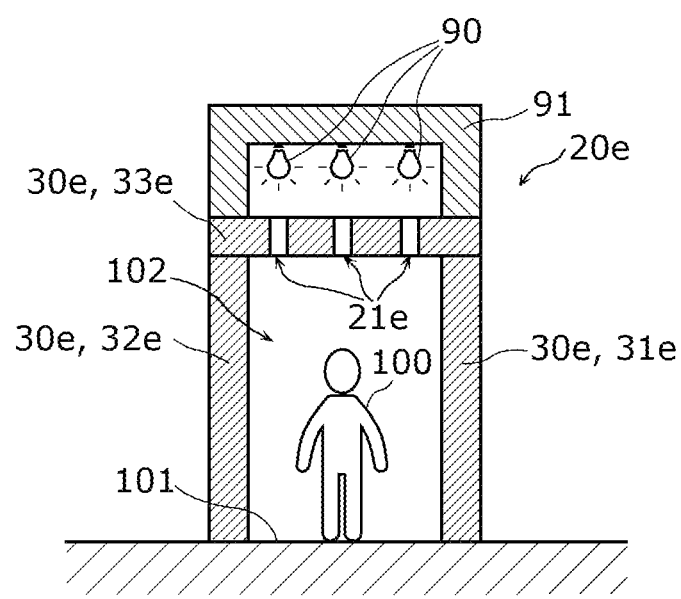
FIG. 18 is a schematic diagram illustrating another example of a cross-sectional structure of a diffuse-reflector according to Embodiment 4 in the case where a lighting fixture is provided above the diffuse-reflector.

In addition, imaging apparatus 10f may include diffuse-reflector 20e instead of diffuse-reflector 20. FIG. 18 is a schematic diagram illustrating a cross-sectional structure of diffuse-reflector 20e above which lighting fixture 90 is provided. FIG. 18 illustrates a cross section of diffuse-reflector 20e when cut in the vertical direction by a line perpendicular to the direction in which pathway 101 extends in a top view.

As illustrated in FIG. 18, lighting fixture 90 supported by supporting member 91 is provided above diffuse-reflector 20e, specifically, above reflector 33e. As described above, diffuse-reflector 20e includes gap 21e which transmits visible light. Lighting fixture 90 emits visible light to imaging space 102 through gap 21e which is a visible light transmissive area. In this way, since human 100 is irradiated with a larger amount of visible light, it is possible to further reduce the cooped-up feeling of human 100.

It is to be noted that, when gap 21e is formed also in one of reflector 31e or 32e, lighting fixture 90 may be provided at a position at which visible light is emitted to imaging space 102 through gap 21e in the one of reflector 31e or 32e.

In addition, the diffuse-reflectors included in imaging apparatus 10f are not limited to diffuse-reflectors 20 and 20e described above, and may be any diffuse-reflector having a visible light transmissive area, like the diffuse-reflector according to each of Embodiments 1 to 3.

Other Embodiments

Although the imaging apparatus according to the present disclosure has been described above based on Embodiments 1 to 4, the present disclosure is not limited to the embodiments. Various modifications to the embodiment which may be conceived by those skilled in the art, as well as embodiments resulting from optional combinations of elements from different embodiments may be included within the scope of one or more aspects of the present disclosure as long as they do not depart from the scope of the present disclosure.

Figure 19:
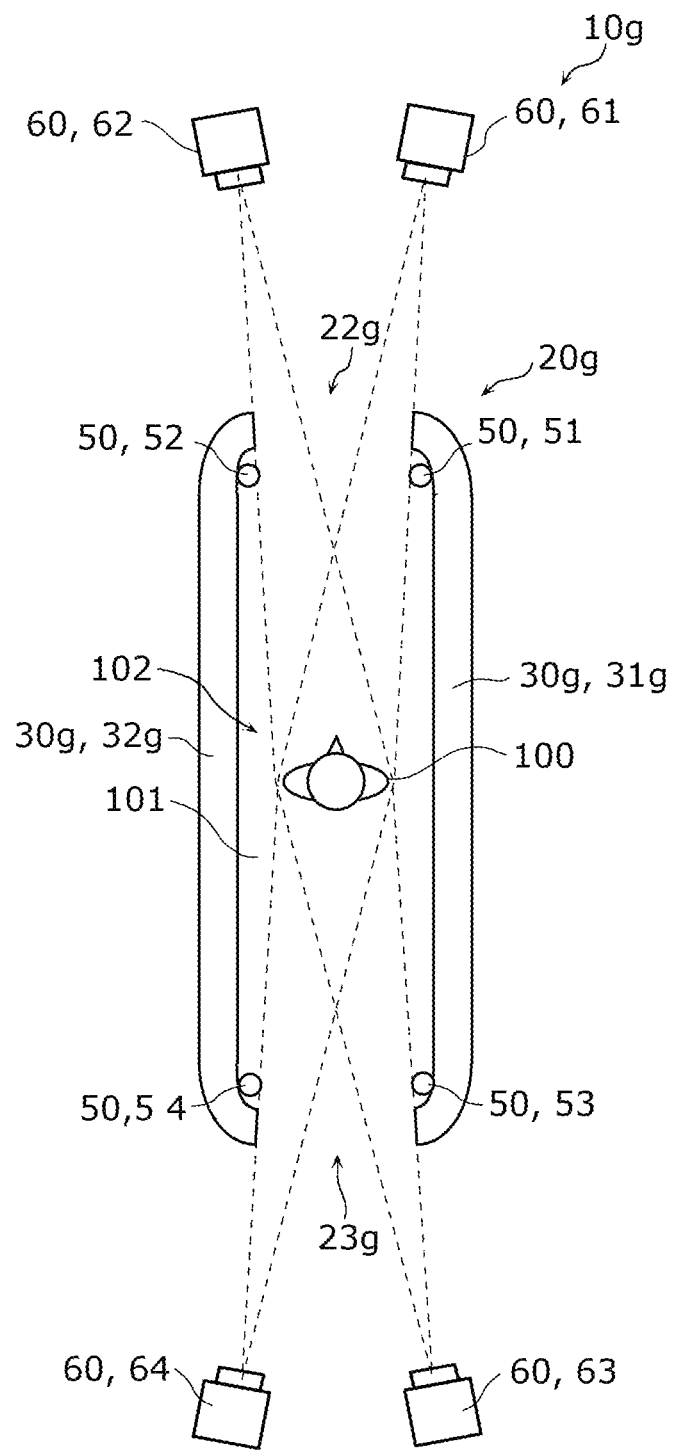
FIG. 19 is a schematic diagram illustrating an imaging apparatus according to a variation when seen from above.

For example, the width of diffuse-reflector 20 when seen from above is constant in Embodiment 1, but the width is not limited to be constant. FIG. 19 is a schematic diagram when imaging apparatus 10g according to a variation is seen from above. FIG. 19 is also a diagram in the case where diffuse-reflector 20g is illustrated in a top perspective view, as in FIG. 3. As illustrated in FIG. 19, imaging apparatus 10g is configured to include diffuse-reflector 20g instead of diffuse-reflector 20 of imaging apparatus 10. Diffuse-reflector 20g includes reflector 30g instead of reflector 30 of diffuse-reflector 20. Specifically, diffuse-reflector 20g includes reflectors 31g and 32g instead of reflectors 31 and 32 of diffuse-reflector 20. Diffuse-reflector 20g has a structure in which opening parts 22g and 23g which are entrances to and exits from imaging space 102 are narrowed. Diffuse-reflector 20g has the shortest distance between reflectors 31g and 32g in opening parts 22g and 23g. In other words, diffuse-reflector 20g has a structure in which the width of pathway 101 is the shortest in opening parts 22g and 23g which are the entrances to and the exits from imaging space 102 in diffuse-reflector 20g. In this way, a sub-terahertz wave that entered imaging space 102 does not leak much from opening parts 22g and 23g. In addition, the structure of diffuse-reflector 20g may be applied to any of the diffuse-reflectors according to Embodiments 2 to 4.

Figure 20:
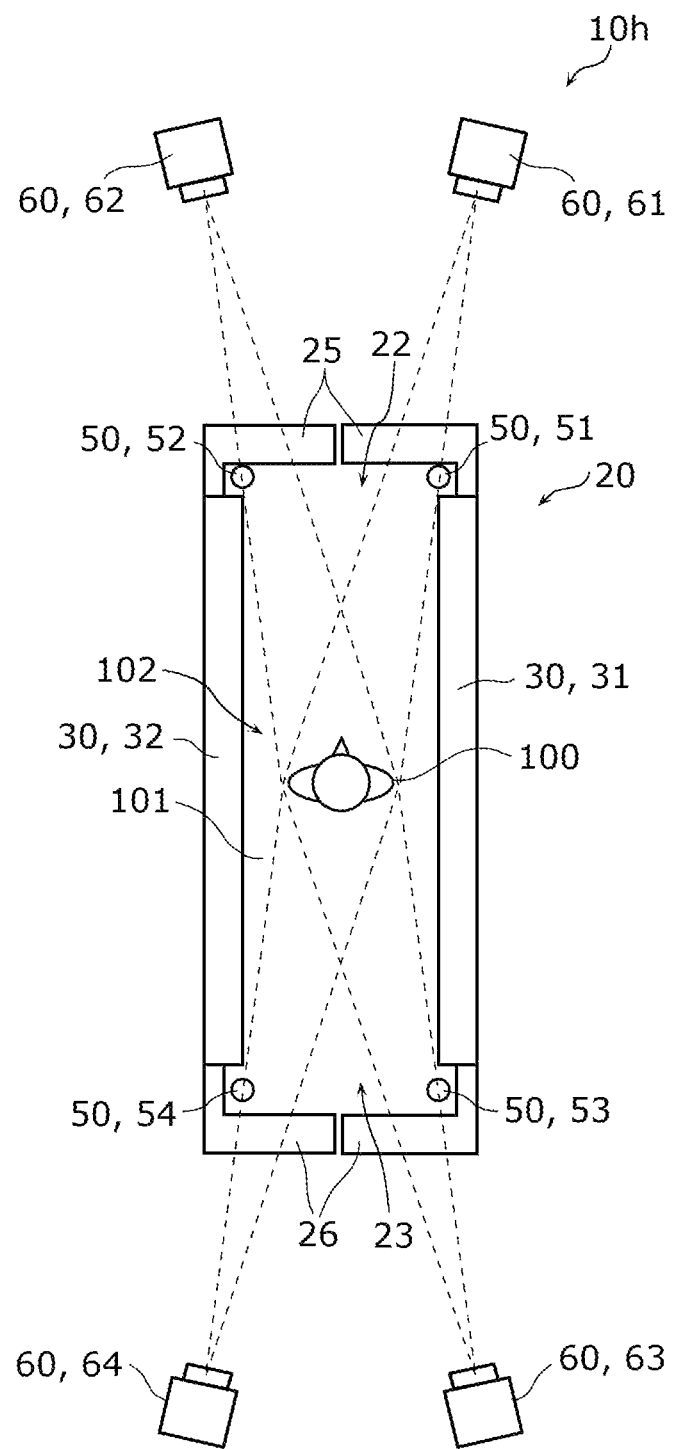
FIG. 20 is a schematic diagram illustrating an imaging apparatus according to another variation when seen from above.

In addition, for example, imaging apparatus 10 according to Embodiment 1 may further include doors. FIG. 20 is a schematic diagram when imaging apparatus 10h according to another variation is seen from above. As illustrated in FIG. 20, imaging apparatus 10h includes doors 25 and 26, in addition to the configuration of imaging apparatus 10. Doors 25 and 26 respectively cover opening parts 22 and 23 of diffuse-reflector 20 which are entrances to and exits from imaging space 102. Door 25 is located forward of diffuse-reflector 20, and door 26 is located backward of diffuse-reflector 20.

Each of doors 25 and 26 is the same in material and configuration as reflector 30, diffusely reflects a sub-terahertz wave, and transmits visible light. Alternatively, each of doors 25 and 26 may be the same in material and configuration as one of reflector 30a or 30b, and may diffusely reflect a sub-terahertz wave, and transmit visible light, specifically, diffusely reflect or mirror-reflect visible light.

By means of providing doors 25 and 26 to imaging apparatus 10h, doors 25 and 26 each diffusely transmit a sub-terahertz wave, and thus the sub-terahertz wave that entered imaging space 102 does not leak much from opening parts 22 and 23.

Doors 25 and 26 are provided, for example, at positions at which doors 25 and 26 do not be obstacles for detector 60 when detector 60 receives a reflected wave of a sub-terahertz wave reflected by human 100. For example, the height of each of doors 25 and 26 from pathway 101 is smaller than the height of detector 60 from pathway 101. In addition, doors 25 and 26 may be arranged to sandwich each detector 60 from the both sides in the direction in which pathway 101 extends, and reflector 30 may extend to reach doors 25 and 26.

In addition, any of the imaging apparatuses according to Embodiments 2 to 4 may include doors 25 and 26.

In addition, although reflector 30 includes sub-terahertz wave reflective member 41 and visible light transmissive members 44 and 47 in Embodiment 1, this is a non-limiting example. Reflector 30 does not always need to include at least one of visible light transmissive member 44 or 47. In addition, when sub-terahertz wave reflective member 41 is configured using a material having a high mechanical strength such as a punched metal, reflector 30 may be configured to include only sub-terahertz wave reflective member 41 out of sub-terahertz wave reflective member 41 and visible light transmissive members 44 and 47.

In addition, although gaps 21c, 21d, and 21e are provided to be located above imaging space 102 in Embodiment 3, this is a non-limiting example. Gaps 21c, 21d, and 21e may be formed to be located at a side of imaging space 102, or a plurality of gaps may be formed above and at a side of imaging space 102.

Although the imaging target is human 100 in Embodiments 1 to 4 described above, imaging targets are not limited thereto. Imaging targets may be baggage, etc.

Alternatively, for example, imaging apparatus 10 does not always need to include all the elements described in the embodiments and each variation, and may include only elements for causing desired operations.

In the above embodiments 1 to 4, each of the elements such as image processor 70 may be configured as dedicated hardware or may be implemented by executing a software program suitable for the element. Each of the elements may be implemented by means of a program executer such as a CPU or a processor reading and executing a software program recorded on a recording medium such as a hard disc or a semiconductor memory.

In addition, each of the elements may be a circuit (or an integrated circuit). Each of the circuits may be configured as one circuit as a whole, or as separated circuits. Each of the circuits may be a general circuit or a dedicated circuit.

In addition, various modification, replacement, addition, omission, etc., to the above embodiment may be made within the scope of the claims or the ranges equivalent to the scope.

Each of the elements in each of the above-described embodiments may be configured in the form of an exclusive hardware product, or may be realized by executing a software program suitable for the element. Each of the elements may be realized by means of a program executing unit, such as a CPU and a processor, reading and executing the software program recorded on a recording medium such as a hard disk or a semiconductor memory. Here, the software program for realizing the imaging apparatus according to each of the embodiments is a program described below.

The herein disclosed subject matter is to be considered descriptive and illustrative only, and the appended Claims are of a scope intended to cover and encompass not only the particular embodiments disclosed, but also equivalent structures, methods, and/or uses.

INDUSTRIAL APPLICABILITY

The imaging apparatuses according to one or more exemplary embodiments disclosed herein are widely applicable to imaging apparatuses which image objects.

The invention claimed is:
1. An imaging apparatus comprising:
a diffuse-reflector which covers an imaging space on a pathway that an imaging target passes through, from at least a side out of both sides of the pathway, and includes a reflector which diffusely reflects a sub-terahertz wave;
a light source which emits a sub-terahertz wave onto the reflector; and
a detector which receives a reflected wave of the sub-terahertz wave which has been emitted from the light source, diffusely reflected by the reflector, and reflected by the imaging target, and detects an intensity of the reflected wave received,
wherein the diffuse-reflector includes, in a region in which the reflector is located, a visible light transmissive area which transmits visible light, and transmits visible light through the visible light transmissive area,
the reflector includes:
a sub-terahertz wave reflective member having a sheet shape which diffusely reflects a sub-terahertz wave and transmits visible light; and
two visible light transmissive members which transmit a sub-terahertz wave and visible light,
at least one imaging space side main surface out of two main surfaces of the sub-terahertz wave reflective member is a concave-convex surface,
both the two main surfaces of the sub-terahertz wave reflective member are each covered by a corresponding one of the two visible light transmissive members,
the two visible light transmissive members each include a flat surface at a side of the visible light transmissive member, the side being opposite to a sub-terahertz wave reflective member side of the visible light transmissive member, and
the flat surface of each of the two visible light transmissive members constitutes a surface of the reflector.
2. The imaging apparatus according to claim 1,
wherein the reflector has a structure in which a first visible light transmissive member, the sub-terahertz wave reflective member, and a second visible light transmissive member are stacked in stated order, the first visible light transmissive member being located at an imaging space side out of the two visible light transmissive members and the second visible light transmissive member being located at a side opposite to the imaging space side out of the two visible light transmissive members.
3. The imaging apparatus according to claim 1,
wherein the sub-terahertz wave reflective member is a conductive thin film, and the conductive thin film is a transparent conductive oxide or metal thin film.

4. The imaging apparatus according to claim 1,
wherein the sub-terahertz wave reflective member is a conductive mesh, and an opening of the conductive mesh is in a range from 500 nm to 6 mm, inclusive.

5. The imaging apparatus according to claim 1,
wherein the sub-terahertz wave reflective member is a punched metal, and a maximum hole diameter in the punched metal is in a range from 500 nm to 6 mm, inclusive.

6. The imaging apparatus according to claim 1,
wherein the two main surfaces each have an average length of a roughness curve element that is 0.15 mm or more, and a concave-convex shape of a first main surface and a concave-convex shape of a second main surface match each other, the first main surface and the second main surface being the two main surfaces.

7. The imaging apparatus according to claim 1,
wherein flat surfaces of the two visible light transmissive members are parallel to each other.

8. The imaging apparatus according to claim 1,
wherein the reflector further covers the imaging space at least partly from above.

9. The imaging apparatus according to claim 8,
wherein the diffuse-reflector includes an other visible light transmissive area in a region in which a gap in the diffuse-reflector is located,
the gap is located above the imaging space, and
a width of the gap is smaller than a height of the diffuse-reflector from the pathway.

10. The imaging apparatus according to claim 9,
wherein the gap extends in a direction in which the pathway extends, and
the width of the gap is smaller than a width of the pathway.

11. An imaging apparatus comprising:
a diffuse-reflector which covers an imaging space on a pathway that an imaging target passes through, from at least a side out of both sides of the pathway, and includes a reflector which diffusely reflects a sub-terahertz wave;
a light source which emits a sub-terahertz wave onto the reflector; and
a detector which receives a reflected wave of the sub-terahertz wave which has been emitted from the light source, diffusely reflected by the reflector, and reflected by the imaging target, and detects an intensity of the reflected wave received,
wherein the reflector reflects visible light from the imaging space,
the reflector includes:
a sub-terahertz wave reflective member having a sheet shape which diffusely reflects a sub-terahertz wave;
a visible light diffuse-reflector which transmits a sub-terahertz wave and diffusely reflects visible light; and
a cover member,
wherein at least an imaging space side main surface out of two main surfaces of the sub-terahertz wave reflective member is a concave-convex surface,
the imaging space side main surface of the sub-terahertz wave reflective member out of the two main surfaces is covered by the visible light diffuse-reflective member,
the visible light diffuse-reflective member includes a visible light diffuse-reflective surface which is flat and diffusely reflects visible light, at a side of the visible light diffuse-reflective member, the side being opposite to a sub-terahertz wave reflective member side of the visible light diffuse-reflective member,
the main surface located at a side of the sub-terahertz wave reflective member out of the two main surfaces is covered by the cover member, the side being opposite to the imaging space side of the sub-terahertz wave reflective member,
the cover member includes a flat surface at a side of the cover member, the side being opposite to the sub-terahertz wave reflective member side of the cover member, and
the visible light diffuse-reflective surface and the flat surface each constitute a surface of the reflector.

12. The imaging apparatus according to claim 11,
wherein the reflector has a structure in which the visible light diffuse-reflective member, the sub-terahertz wave reflective member, and the cover member are stacked in stated order.

13. The imaging apparatus according to claim 11,
wherein the visible light diffuse-reflective member includes a crystalline resin material or visible light diffusive particles.

14. The imaging apparatus according to claim 11, further comprising:
a projector which projects an image or a video onto the visible light diffuse-reflective surface.

15. An imaging apparatus comprising:
a diffuse-reflector which covers an imaging space on a pathway that an imaging target passes through, from at least a side out of both sides of the pathway, and includes a reflector which diffusely reflects a sub-terahertz wave;
a light source which emits a sub-terahertz wave onto the reflector; and
a detector which receives a reflected wave of the sub-terahertz wave which has been emitted from the light source, diffusely reflected by the reflector, and reflected by the imaging target, and detects an intensity of the reflected wave received,
wherein the reflector reflects visible light from the imaging space,
wherein the reflector includes:
a sub-terahertz wave reflective member having a sheet shape which diffusely reflects a sub-terahertz wave;
a visible light mirror-reflective member which transmits a sub-terahertz wave and mirror-reflects visible light; and
a cover member,
wherein at least an imaging space side main surface out of two main surfaces of the sub-terahertz wave reflective member is a concave-convex surface,
an imaging space side main surface of the sub-terahertz wave reflective member out of the two main surfaces is covered by the visible light mirror-reflective member,
the visible light mirror-reflective member includes a visible light mirror-reflective surface which is flat and mirror-reflects visible light, at a side of the visible light mirror-reflective member, the side being opposite to a sub-terahertz wave reflective member side of the visible light mirror-reflective member,
a main surface located at a side of the sub-terahertz wave reflective member out of the two main surfaces is covered by the cover member, the side being opposite to the imaging space side of the sub-terahertz wave reflective member,
the cover member includes a flat surface at a side of the cover member, the side being opposite to the sub-terahertz wave reflective member side of the cover member, and the visible light mirror-reflective surface constitutes an imaging space side surface of the reflector.

16. The imaging apparatus according to claim 15, wherein the visible light mirror-reflective member includes a dielectric multi-layer film.

17. The imaging apparatus according to claim 1, wherein the reflector sandwiches the imaging space from the both sides of the pathway.

18. The imaging apparatus according to claim 17, wherein the diffuse-reflector has a structure in which a width of the pathway is smallest in an opening part in the diffuse-reflector, the opening part being an entrance to and an exit from the imaging space.

19. The imaging apparatus according to claim 17, further comprising:
a door which covers an opening part in the diffuse-reflector, the opening part being an entrance to and an exit from the imaging space,
wherein (i) the door diffusely reflects a sub-terahertz wave and transmits visible light or (ii) diffusely reflects a sub-terahertz wave and reflects visible light.

20. The imaging apparatus according to claim 1, wherein the two main surfaces are not exposed.

* * * * *